United States Patent
Andoh et al.

(10) Patent No.: US 10,086,589 B2
(45) Date of Patent: Oct. 2, 2018

(54) MULTILAYER COMPOSITE BODY OF METAL AND POLYPROPYLENE-BASED RESIN COMPOSITION AND METHOD FOR PRODUCING SAME

(71) Applicant: NIPPON PAPER INDUSTRIES CO., LTD., Tokyo (JP)

(72) Inventors: Naoki Andoh, Yokohama (JP); Masao Takahashi, Isesaki (JP); Yoshihiro Yamaguchi, Koshigaya (JP); Yasutaka Watanabe, Tokyo (JP); Kenichi Fujino, Tokyo (JP); Masayoshi Miki, Iwakuni (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 78 days.

(21) Appl. No.: 15/300,692

(22) PCT Filed: Mar. 27, 2015

(86) PCT No.: PCT/JP2015/059807
§ 371 (c)(1),
(2) Date: Sep. 29, 2016

(87) PCT Pub. No.: WO2015/152101
PCT Pub. Date: Oct. 8, 2015

(65) Prior Publication Data
US 2017/0129217 A1    May 11, 2017

(30) Foreign Application Priority Data

Mar. 31, 2014  (JP) ................................. 2014-074043
Dec. 4, 2014   (JP) ................................. 2014-246291

(51) Int. Cl.
| | | |
|---|---|---|
| B32B 15/14 | (2006.01) | |
| B05D 7/16  | (2006.01) | |
| B05D 7/00  | (2006.01) | |
| B29C 45/14 | (2006.01) | |
| B05D 3/00  | (2006.01) | |
| B32B 15/20 | (2006.01) | |
| B29C 45/00 | (2006.01) | |
| B29C 43/00 | (2006.01) | |
| B29C 43/02 | (2006.01) | |
| B32B 37/18 | (2006.01) | |
| C08F 255/02 | (2006.01) | |
| B29K 705/10 | (2006.01) | |
| B29K 705/02 | (2006.01) | |

(Continued)

(52) U.S. Cl.
CPC .............. *B32B 15/14* (2013.01); *B05D 3/002* (2013.01); *B05D 7/16* (2013.01); *B05D 7/546* (2013.01); *B29C 43/003* (2013.01); *B29C 43/02* (2013.01); *B29C 45/0001* (2013.01); *B29C 45/14336* (2013.01); *B32B 15/20* (2013.01); *B32B 37/182* (2013.01); *C08F 255/02* (2013.01); *B29C 2045/1454* (2013.01); *B29C 2045/14532* (2013.01); *B29C 2045/14868* (2013.01); *B29K 2023/12* (2013.01); *B29K 2309/08* (2013.01); *B29K 2701/12* (2013.01); *B29K 2705/02* (2013.01); *B29K 2705/10* (2013.01); *B29K 2995/0078* (2013.01); *B32B 2250/02* (2013.01); *B32B 2255/06* (2013.01); *B32B 2255/26* (2013.01); *B32B 2255/28* (2013.01); *B32B 2260/021* (2013.01); *B32B 2260/046* (2013.01); *B32B 2262/101* (2013.01); *B32B 2305/08* (2013.01); *B32B 2307/542* (2013.01); *B32B 2311/12* (2013.01); *B32B 2311/24* (2013.01); *B32B 2315/085* (2013.01); *B32B 2419/00* (2013.01)

(58) Field of Classification Search
CPC .................................. B32B 15/14; B05D 7/16
See application file for complete search history.

(56) References Cited

U.S. PATENT DOCUMENTS

2013/0264741 A1   10/2013   Ookura et al.

FOREIGN PATENT DOCUMENTS

| EP | 2 853 370 A1 | 4/2015 |
|---|---|---|
| JP | 2003-103563 A | 4/2003 |

(Continued)

OTHER PUBLICATIONS

International Search Report dated Jun. 30, 2015, issued in counterpart International Application No. PCT/JP2015/059807 (1 page).

*Primary Examiner* — Robert D. Harlan
(74) *Attorney, Agent, or Firm* — Westerman, Hattori, Daniels & Adrian, LLP

(57) ABSTRACT

A multilayer composite body in which a shaped metal article, a thermosetting resin layer, a modified polyolefin resin layer, and a polypropylene-based resin composition, or a PP-based GFRTP are laminated in the order of description. A multilayer composite body of a metal and a resin is obtained which excels in a fixing strength (shear breaking stress) between the shaped metal article and the molded article of the polypropylene-based resin composition. The thermosetting resin layer is composed mainly of a urethane resin or an epoxy resin. The polypropylene-based resin composition is molded by an injection molding. The modified polyolefin resin forming the modified polyolefin resin layer includes one or two or more of non-chlorinated modified polyolefin resins having a weighted average of melting points of 70° C. to 110° C., as determined with a differential scanning calorimeter (DSC).

12 Claims, 6 Drawing Sheets

(51) Int. Cl.
*B29K 701/12* (2006.01)
*B29K 23/00* (2006.01)
*B29K 309/08* (2006.01)

(56) References Cited

FOREIGN PATENT DOCUMENTS

| | | |
|---|---|---|
| JP | 2004-216609 A | 8/2004 |
| JP | 2010-64397 A | 3/2010 |
| JP | 2013-91268 A | 5/2013 |
| JP | WO2013/175693 A1 | 11/2013 |
| WO | WO 2005/082963 A1 * | 9/2005 |
| WO | 2012/060311 A1 | 5/2012 |
| WO | WO 2012/060311 A1 * | 5/2012 |
| WO | WO 2013/175693 A1 * | 11/2013 |

* cited by examiner

FIG.2 (a)
FIG.2 (b)
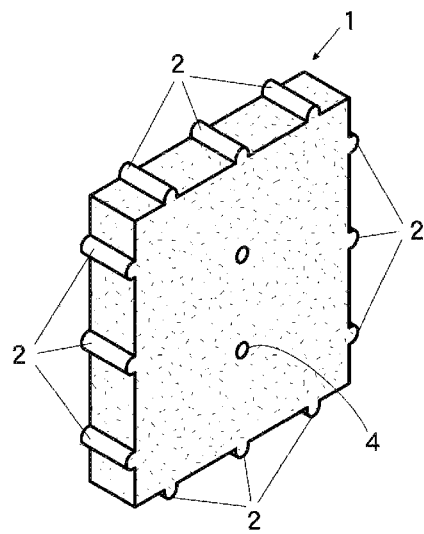
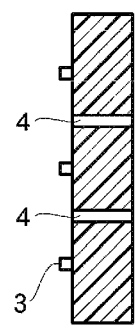
FIG.3
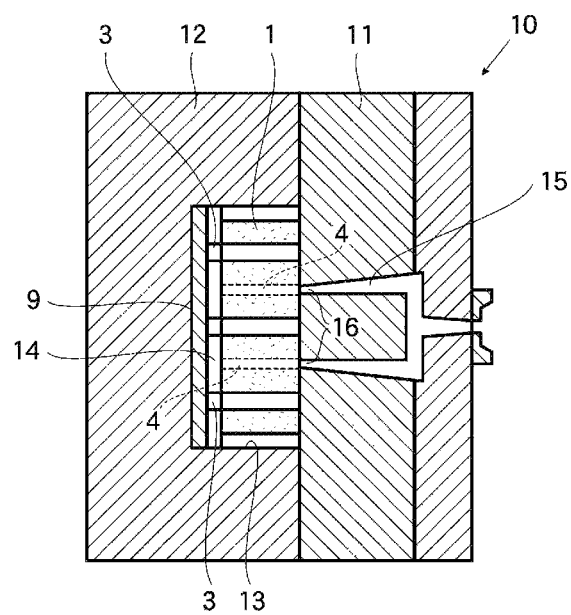

US 10,086,589 B2

MULTILAYER COMPOSITE BODY OF METAL AND POLYPROPYLENE-BASED RESIN COMPOSITION AND METHOD FOR PRODUCING SAME

TECHNICAL FIELD

The present invention relates to a multilayer composite body of a metal and a polypropylene-based resin composition, and to a method for producing the multilayer composite body. More particularly, the present invention relates to a multilayer composite body of a metal and a polypropylene-based resin composition in which a polar resin layer, an adhesive composition layer, and a non-polar resin layer (polypropylene resin layer) are successively laminated on a shaped metal article, and to a method for producing the multilayer composite body.

BACKGROUND ART

Composite bodies (multilayer bodies) in which various metals and resins are laminated and integrated have been used as exterior materials, protective materials, etc. for machines and buildings, in members such as parts for use in home appliances, mobile machines such as automobiles, general machinery, medical machinery, industrial machinery, building materials for buildings such as houses, and construction materials for civil engineering structures or the like. As an example of such multilayer composite bodies in which various alloys and resins are integrated, PTL 1 discloses a multilayer composite body of a metal and a resin suggested by the inventors of the present application et al., this multilayer composite body being obtained by treating a shaped aluminum alloy article with an aqueous hydrazine solution, a water-soluble amine compound, or the like, to obtain the shaped aluminum having the thus treated surface provided with an ultrafine uneven structure with a period of 20 nm to 50 nm, and then injection molding a resin such as a polybutylene terephthalate resin directly on the aluminum alloy to integrate the alloy and the resin.

Further, PTL 2 discloses a multilayer composite body obtained by chemically etching a surface of a metal to obtain an uneven structure on which granules or shaped irregular polygons with a diameter of 20 nm to 70 nm are laminated with an irregular period of 0.5 µm to 10 µm, and injection joining a polyphenylene sulfide resin, a polybutylene terephthalate resin, and a polyamide resin onto the metal. PTL 3 discloses a multilayer composite body obtained by coating a coat material of a thermosetting resin such as a urethane curable resin on a molded article of a hard plastic, and injection joining a polybutylene terephthalate resin onto the coated surface.

Meanwhile, polyolefin-based resins such as polypropylene resins have been widely used as inexpensive construction materials with excellent mechanical properties, and such resins generally excel in weather resistance, chemical resistance, and light weight; however, a problem arising because of the polyolefin-based resins being nonpolar resin compositions is that the adhesion thereof to metals is poor and multilayer composite bodies of metals and resins in which the polyolefin-based resins are joined to shaped metal articles cannot be easily produced.

To resolve this problem, it has been suggested to form a primer layer of a resin material including a polyolefin on the surface of a metal member and inject polypropylene, which excels in cost performance, onto the primer layer to join the metal member and polypropylene together (PTL 4).

CITATION LIST

Patent Literature

[PTL 1] Japanese Patent Application Publication No. 2003-103563
[PTL 2] Japanese Patent Application Publication No. 2010-64397
[PTL 3] Japanese Patent Application Publication No. 2004-216609
[PTL 4] WO 2013/175693

SUMMARY OF INVENTION

Technical Problem

However, although the above-described prior art techniques make it possible to obtain multilayer composite bodies in which a metal material and a PP injection molded article are integrally joined together, a bond (fixing) strength between the metal material and the PP injection-molded article is not always at a level suitable for practical use.

It is an objective of the present invention to provide a multilayer composite body of a metal and a polypropylene-based resin composition in which a shaped metal article and a general-purpose polypropylene-based resin (referred to hereinbelow as "PP") composition are joined together by injection molding, and also to provide a method for producing the multilayer composite body.

It is another objective of the present invention to provide a multilayer composite body of a metal and a polypropylene-based resin composition in which a shaped metal article and a general-purpose polypropylene-based resin composition are joined together by injection molding, the multilayer composite body excelling in the adhesive strength (shear breaking strength) between the shaped metal article and the polypropylene-based resin composition, and also to provide a method for producing the multilayer composite body.

It is yet another objective of the present invention to provide a multilayer composite body of a metal and a polypropylene-based resin composition in which the metal and a glass fiber reinforced thermoplastic plastic (GFRTP) have a high bond strength, and also to provide a method for producing the multilayer composite body.

It is still another objective of the present invention to provide a multilayer composite body of a metal and a polypropylene-based resin composition which is high in productivity and in which the metal and a PP-based GFRTP have a high bond strength, and also to provide a method for producing the multilayer composite body.

Solution to Problem

A multilayer composite body of a metal and a polypropylene-based resin composition of Present Invention 1 is a multilayer composite body of a metal and resins in which a thermosetting resin layer, a modified polyolefin resin layer, and a polypropylene-based resin composition are laminated on a shaped metal article, wherein the modified polyolefin resin layer satisfies the following Condition (1) or Condition (2):
Condition (1)
  the modified polyolefin resin layer includes a modified polyolefin resin which has a weight-average molecular weight of 100,000 to 200,000 and a melting point of 70° C. to 110° C., as determined with a differential scanning calorimeter (DSC), and in which two or more selected from an α,β-unsaturated carboxylic acid or a derivative of the α,β-unsaturated carboxylic acid (B) and a (meth)acrylic acid ester (C) are graft polymerized onto a copolymer-type polyolefin (A) as a base material; and Condition (2)

the modified polyolefin resin layer includes two or more of modified polyolefin resins in which two or more selected from an α,β-unsaturated carboxylic acid or a derivative of the α,β-unsaturated carboxylic acid (B) and a (meth)acrylic acid ester (C) are graft polymerized onto a copolymer-type polyolefin (A) as a base material, the weighted average of the melting points of the two or more included modified polyolefin resins being 70° C. to 110° C.

A multilayer composite body of a metal and a polypropylene-based resin composition of Present Invention 2 is the multilayer composite body of Present Invention 1, wherein a thermosetting resin layer, a modified polyolefin resin layer, a polypropylene-based resin composition, and a glass fiber reinforced thermoplastic plastic (GFRTP) are laminated on the shaped metal article.

A multilayer composite body of a metal and a polypropylene-based resin composition of Present Invention 3 is the multilayer composite body of Present Invention 2, wherein a surface of the glass fiber reinforced thermoplastic plastic (GFRTP) has the modified polyolefin resin layer.

A multilayer composite body of a metal and a polypropylene-based resin composition of Present Invention 4 is the multilayer composite body of Present Inventions 1 to 3, wherein the thermosetting resin layer is a coat material composed mainly of a urethane resin or an epoxy resin.

A multilayer composite body of a metal and a polypropylene-based resin composition of Present Invention 5 is the multilayer composite body of Present Inventions 1 to 4, wherein the polypropylene-based resin is molded by injection molding; and an average shear breaking stress between the shaped metal article and the polypropylene-based resin is 13 MPa or more.

A multilayer composite body of a metal and a polypropylene-based resin composition of Present Invention 6 is the multilayer composite body of Present Inventions 1 to 5, wherein the copolymer-type polyolefin (A) is at least one selected from the group consisting of ethylene copolymer-type polypropylene, 1-butene copolymer-type polypropylene, and ethylene-1-butene copolymer-type polypropylene.

A multilayer composite body of a metal and a polypropylene-based resin composition of Present Invention 7 is the multilayer composite body of Present Invention 1, wherein the (meth)acrylic acid ester (C) is at least a compound represented by General Formula (1):

$$CH_2=CR_1COOR_2— \quad (1)$$

(here, in Formula (1), $R_1$=H or $CH_3$, $R_2$=$C_nH_{2n+1}$, n is an integer of 8 to 18).

A multilayer composite body of a metal and a polypropylene-based resin composition of Present Invention 8 is the multilayer composite body of Present Inventions 1 to 7, wherein at least one of the grafted mass of the α,β-unsaturated carboxylic acid or a derivative thereof (B) and the grafted mass of the (meth)acrylic acid ester (C) is 0.1 mass % to 10 mass %.

A method for producing a multilayer composite body of a metal and a polypropylene-based resin composition of the Present Invention 9 includes:

a step of preparing a shaped metal article with a chemically or physically roughened surface;

a step of coating a first coat material composed mainly of a urethane resin or an epoxy resin on the shaped metal article and semi-curing the resin layer by heating;

a step of coating, on the semi-cured first coat material, a second coat material composed of a modified polyolefin resin which has a weight-average molecular weight of 100,000 to 200,000 and a melting point of 70° C. to 110° C., as determined with a differential scanning calorimeter (DSC), and in which an α,β-unsaturated carboxylic acid or a derivative thereof (B) and a (meth)acrylic acid ester (C) are graft polymerized onto a copolymer-type polypropylene (A) as a base material, then heating, allowing to cool, additionally curing the first coat material as a prime layer and the second coat material, and melting and fixedly attaching the modified polyolefin resin coat material layer; and a step of obtaining an injection joined article by inserting the shaped metal article on which the first coat material and the second coat material have been coated and fixed into an injection molding die, injecting a polypropylene-based resin composition onto the second coat material, and opening the die to integrate the shaped metal article and the polypropylene-based composition with each other.

A method for producing a multilayer composite body of a metal and a polypropylene-based resin composition of the Present Invention 10 is the production method of the Present Invention 9, wherein the second coat material includes two or more of modified polyolefin resins, and a weighted average of melting points of the modified polyolefin resins is 70° C. to 110° C.

A method for producing a multilayer composite body of a metal and a polypropylene-based resin composition of the Present Invention 11 includes:

a step of preparing a shaped metal article with a chemically or physically roughened surface;

a step of coating a first coat material composed mainly of a urethane resin or an epoxy resin on the shaped metal article and semi-curing the resin layer by heating;

a step of coating, on the semi-cured first coat material, a second coat material composed of a modified polyolefin resin which has a weight-average molecular weight of 100,000 to 200,000 and a melting point of 70° C. to 110° C., as determined with a differential scanning calorimeter (DSC), and in which an α,β-unsaturated carboxylic acid or a derivative of the α, β-unsaturated carboxylic acid (B) and a (meth)acrylic acid ester (C) are graft polymerized onto a copolymer-type polypropylene (A) as a base material, then heating, allowing to cool, additionally curing the first coat material as a prime layer and the second coat material, and melting and fixedly attaching the modified polyolefin resin coat material layer;

on the semi-cured first coat material, the modified polyolefin resin being obtained by graft polymerizing two or more selected from an α,β-unsaturated carboxylic acid or a derivative of the α,β-unsaturated carboxylic acid (B) and a (meth)acrylic acid ester (C) onto a copolymer-type polyolefin (A) as a base material a step of inserting the shaped metal article on which the first coat material and the second coat material have been coated and fixed, and a glass fiber reinforced thermoplastic plastic (GFRTP) including glass fibers and a polypropylene resin as a matrix resin into an injection molding die; and a step of obtaining a multilayer composite body by injecting a polypropylene-based resin composition between the second coat material and the glass fiber reinforced thermoplastic plastic (GFRTP) to integrate the shaped metal article and the glass fiber reinforced thermoplastic plastic (GFRTP) with each other.

A method for producing a multilayer composite body of a metal and a polypropylene-based resin composition of the Present Invention 12 is the production method of the Present Invention 11, wherein the second coat material includes two or more of modified polyolefin resins, and a weighted average of melting points of the modified polyolefin resins is 70° C. to 110° C.

The definition of each of the abovementioned constituent elements which constitute the present invention is explained hereinbelow.

[Multilayer Composite Body of a Metal and a Polypropylene-Based Resin Composition]

The basic structure of the "multilayer composite body of a metal and a polypropylene-based resin composition", which is referred to in the present invention, is obtained by successively laminating a thermosetting resin layer, a modified polyolefin resin layer, and a polypropylene-based resin composition and/or a glass fiber reinforced thermoplastic plastic (referred to hereinbelow as PP-based GFRTP) including a polypropylene-based resin composition as a matrix resin on a shaped metal article. In the method for producing the multilayer composite body, the thermosetting resin layer and the modified polyolefin resin layer as a top layer thereon are successively formed on the shaped metal article, a composition including a polypropylene-based resin as the main component and/or the PP-based GFRTP is then laminated thereon by injection molding. The multilayer composite body of a metal and a polypropylene-based resin composition of the present invention is a multilayer composite body (multilayer material) in which various metals and resins are integrated, the multilayer composite body being suitable as an exterior material and a protective material for apparatuses, machines, and buildings in the fields of home appliances, mobile machines such as automobiles, general machinery, medical machinery, industrial machinery, building materials for buildings such as houses, and construction materials to be used in the field of civil engineering for civil engineering structures or the like.

When a mechanical strength is needed in such applications, glass fibers (referred to hereinbelow as "GF") are admixed to the polypropylene-based resin by a usual method to impart the polypropylene-based resin composition with strength. As a result of admixing the necessary amount of GF, the multilayer composite body can be used as an exterior cover material for protecting with a thin metal sheet the exterior of the above-described various machined and structures, or conversely as an anticorrosive cover material or anticorrosive structural material in which a mechanical strength is imparted by a sheet-shaped metal article and the corrosion of metal portion is prevented with the polypropylene-based resin composition.

[Shaped Metal Article]

In the present invention, the material of the shaped metal article is usually a general-purpose metal such as an aluminum alloy, a magnesium alloy, a titanium alloy, a copper alloy, a stainless steel, a general steel material, an aluminum-plated steel sheet, and a zinc-plated steel sheet. These metals are processed to the desired shape from an ingot, a sheet material, a rod material, or the like, by a usual method by using plastic processing such as press working, saw machining, turning, electrical discharge machining, and cutting-grinding machining such as drilling, grinding, and polishing. The shaped metal article of the present invention is processed to the desired shape by using these processing means, such as mechanical processing and chemical etching, individually or by combining the processing operations. When an aluminum alloy is used as a material for the shaped metal article, aluminum alloys of series 1000 to 7000 stipulated by the Japanese Industrial Standard (JIS), and various aluminum alloys for die casting can be used. The alloys of the series 1000 are high-purity aluminum-based alloys including magnesium, silicon, copper, manganese, and the like. After the mechanical processing, the surface contaminants, oils, fats, etc., are removed by a usual method and chemical etching is thereafter performed by a usual method with a different processing liquid for each metal.

Well-known corrosion-resistant iron alloys which are generally called a Cr stainless steel in which chromium (Cr) is added to iron, a Cr—Ni stainless steel which is a steel obtained by adding a combination of nickel (Ni) and chromium (Cr), and other stainless steels are suitable as the abovementioned stainless steel, examples thereof including Cr stainless steels, such as SUS405, SUS429, and SUS403, and Cr—Ni stainless steels such as SUS304, SUS304L, SUS316, and SUS316L which are stipulated by the Japanese Industrial Standard (JIS), and the like. Among these metal materials, an aluminum-based material is preferred for the shaped metal article because of a light weight and machinability. The surface of the shaped metal article to be used for the multilayer composite body of the present invention is preferably subjected to roughening treatment by an appropriate means such as a chemical etching method which is based on a method of immersing into an acid-base aqueous solution capable of corroding the entire surface of the metal species and then thoroughly washing with water, or physical processing based on abrasive processing such as grinding, sandpaper processing, and blast processing. As a result of surface roughening or surface roughening also involving conversion treatment, the fixing strength (adhesion) with the below-described thermosetting resin layer on the surface is improved.

[1. Thermosetting Resin Layer (the Above-Mentioned "First Coat Material")]

The thermosetting resin layer of the present invention is a layer that is integrally joined (fixedly attached) to the surface of the shaped metal article. The thermosetting resin layer is a layer including a thermosetting resin such as the below-described urethane resin and epoxy resin as the main component.

(Urethane Resin Curable Layer)

One of the thermosetting resin layers of the present invention is a layer obtained by coating an urethane curable resin coat material, for example, a two-pack urethane curable ink (solvent-type screen ink) on the surface of a metal shaped article, and then heating and semi-curing. In the present invention, the resin directly joined to the surface of the shaped metal article is a thermosetting resin which is the first coat material, and the function thereof is to ensure adhesion to the metal surface and also to bond the material which is to be laminated thereupon. Thus, the material thereupon is a modified polyolefin resin which is the second coat material and has a specific melting point. The modified polyolefin resin serves for bonding the polypropylene-based resin composition which is to be injected for molding as the upper layer on the modified polyolefin resin, this bonding preventing the polypropylene-based resin composition from flowing off. For this reason, the thermosetting resin used as the first coat material is preferably a two-pack thermosetting resin which can be cured at a low temperature, and a two-pack urethane curable resin was used in the below-described examples. More specifically a commercially available two-pack urethane curable coat material, that is, a urethane curable ink, a urethane paint, and the like can be used as the urethane resin curable layer of the present invention.

A material selected from typical inks and paints including the aforementioned thermosetting resin is coated on the shaped metal article subjected to the above-described surface roughening, the coating is heated at a temperature which is 15° C. to 20° C. lower than the curing temperature of the coat material recommended by the coat material manufacturer, the solvent contained in the coat material is evaporated, and the resin in the coat material is semi-cured. As an example, the inventors of the present application et al. used a commercially available two-pack urethane curable ink and performed heating and curing for ten odd minutes at 80° C., which is 15° C. to 20° C. lower than the recommended curing temperature for curing. This is an example in which the coat material was semi-cured.

(Epoxy Resin Curable Layer)

The thermosetting resin layer which is the first coat material of the present invention may be a coat material such as a polar epoxy resin-based paint, ink, or the like, instead of the above-described urethane resin curable layer. The epoxy resin-based coat material may be a one-pack or two-pack epoxy resin. After coating by a usual method on the metal surface, the coat material is heated and cured for ten odd minutes, for example, at 80° C., which is 15° C. to 20° C. lower than the recommended curing temperature for curing.

[Modified Polyolefin Resin Layer (the Above-Mentioned "Second Coat Material")]

The modified polyolefin resin layer (second coat material) of the present invention is a resin layer mainly composed of a modified polyolefin resin and is laminated on the upper layer of the first coat material. This modified polyolefin resin layer is a resin layer obtained by coating a modified polyolefin resin coat material on the upper layer of the semi-cured thermosetting resin layer, and then heating, cooling and solidifying. More specifically, the second coat material is formed by coating a solution of an adhesive composition including a modified polyolefin resin on the semi-cured thermosetting resin layer which is the first coat material. As a result of heating the modified polyolefin resin by raising the temperature above the melting point thereof, the semi-cured urethane curable resin layer or the epoxy resin curable layer are further cured. At the same time, the modified polyolefin resin layer is melted, and when it is subsequently allowed to cool, a solidified and fixed layer is formed.

The resin which is the main component constituting the modified polyolefin resin layer is the below-described specific modified polyolefin resin. This is because, the fixing strength differs significantly depending on the type of the modified polyolefin resin used. Thus, the resin composition used in the present invention is a resin mixture including as the main component one or two or more of non-chlorinated modified polyolefin resins (referred to hereinbelow as "modified polyolefin resins") obtained by using a copolymer-type polyolefin as a base material and graft polymerizing a polar monomer thereonto. The melting point of the resin mixture, as determined with a differential scanning calorimeter (DSC), needs to be 70° C. to 110° C. when the modified polyolefin resin of one type is used. When modified polyolefin resins of two or more types are used, the weighted average of the melting points thereof needs to be 70° C. to 110° C.

Where the melting point or weighted average melting point of the modified polyolefin resin(s) is outside the abovementioned range, sufficient adhesive strength cannot be obtained. In the resin composition which is used for the modified polyolefin resin layer, a well-known resin having adhesivity, such as a polyester resin, a polyurethane resin, and an acrylic resin can be compounded in addition to the modified polyolefin resin within a range in which the desired effect is not impeded.

(Modified Polyolefin Resin)

The modified polyolefin resin is obtained using a copolymer-type polyolefin resin as a base material and graft polymerizing a polar monomer thereonto. This modified polyolefin resin is described hereinbelow. The polyolefin serving as a base material is preferably a copolymer-type polyolefin, rather than a homo-type polyolefin. The copolymer-type polyolefin (A) serving as a base material is not particularly limited, but it is preferred that an α olefin copolymer-type polypropylene, such as an ethylene copolymer-type polypropylene, a 1-butene copolymer-type polypropylene, a 1-pentene copolymer-type polypropylene, and a 1-hexene copolymer-type polypropylene, and a copolymer-type polypropylene including two or more of α olefin comonomers be used. The weight-average molecular weight of the copolymer-type polyolefin serving as a base material can be freely selected for use, provided that the weight-average molecular weight of the modified polyolefin resin obtained after the graft polymerization is within a range of 100,000 to 200,000, but it is preferred that the weight-average molecular weight of the copolymer-type polyolefin be 50,000 to 500,000. Where the weight-average molecular weight is less than 50,000, the desired performance such as adhesivity and solution properties are maintained, but the weight-average molecular weight after the graft polymerization is difficult to fit in the abovementioned range. The problem arising when the weight-average molecular weight is greater than 500,000 is that the viscosity of the reaction system rises and stirring is unsatisfactory.

Where the molecular weight of the modified polyolefin resin is less than 100,000, the molecule length is small, which is apparently why the force bonding the thermosetting resin as the prime layer and the polypropylene-based resin composition joined to the surface thereof is insufficient. Meanwhile, it is undesirable that molecular weight of the modified polyolefin resin be greater than 200,000 because the resin is unlikely to dissolve in solvents and painting ability and coating-forming ability are degraded. Further, the modified polyolefin resin that can be used in the present invention is obtained by graft polymerizing an α,β-unsaturated carboxylic acid or a derivative thereof (B) and a (meth)acrylic acid ester (C) to the above-described component (A) which is a polypropylene resin serving as a base material before the graft polymerization. The component (B) and the component (C) will be described below in detail.

The component (B) is an α,β-unsaturated carboxylic acid or a derivative thereof. Examples suitable as the α,β-unsaturated carboxylic acid and derivative thereof include maleic acid, maleic anhydride, fumaric acid, citraconic acid, citraconic anhydride, mesaconic acid, itaconic acid, itaconic anhydride, aconitic acid, aconitic anhydride, himic anhydride, (meth)acrylic acid, and (meth)acrylic acid esters, but it is particularly preferred that maleic anhydride be used. The component (B) may be one or more of compounds selected from α, β-unsaturated carboxylic acids and derivatives thereof and may be a combination of one or more of α,β-unsaturated carboxylic acids and one or more of derivatives thereof, a combination of two or more of α,β-unsaturated carboxylic acids, and a combination of two or more of derivatives of α,β-unsaturated carboxylic acids.

The grafted mass of the above-described component (B) in the modified polyolefin resin is preferably 0.1 mass % to 10 mass %, more preferably 0.5 mass % to 4 mass % when the modified polyolefin resin is taken as 100 mass %. As a result of the grafted mass being 0.1 mass % or more, the adhesivity of the obtained modified polyolefin resin to the polar resin can be maintained. As a result of the grafted mass being 10 mass % or less, the generation of an ungrafted reaction product and the decrease in molecular weight can be prevented and sufficient adhesivity to the resin adhesion object can be obtained. The grafted mass (%) of the above-described component (B) can be measured by a well-known method. For example, it can be determined by an alkali titration method or a Fourier transform IR spectroscopy.

The above-described component (C) is a (meth)acrylic acid ester. The meth(acrylic)acid ester is an ester of acrylic acid or methacrylic acid, and examples thereof include methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate, cyclohexyl (meth)acrylate, benzyl (meth)acrylate, phenyl (meth)acrylate, dimethylaminoethyl (meth)acrylate, diethylaminoethyl (meth)acrylate, 2-hydroxyethyl (meth)acrylate, N,N-dimethylaminoethyl (meth)acrylate, and acetoacetoxyethyl (meth)acrylate.

The above-described component (C) is more preferably a (meth)acrylic acid ester represented by General Formula (I):

$$CH_2=CR_1COOR_2 \quad (I)$$

In this case, the decrease in molecular weight from the copolymer-type polyolefin resin (A) when the modified polyolefin resin is synthesized can be suppressed, the molecular weight distribution can be narrowed, and solubility of the modified polyolefin resin in solvents, low-temperature stability of the solution thereof, compatibility with other resins in the adhesive resin, and adhesivity can be improved. The (meth)acrylic acid esters represented by General Formula (I) can be used individually or by mixing a plurality thereof in a random proportion.

$R_1$ in the General Formula (I) represents H or $CH_3$, but in the (meth)acrylic acid ester of the present invention, $CH_3$ is preferred. $R_2$ represents $C_nH_{2n+1}$. Here, n represents an integer of 8 to 18; n is preferably 8 to 15, more preferably 8 to 14, and even more preferably 8 to 13. Lauryl (meth)acrylate, octyl (meth)acrylate, and tridecyl (meth)acrylate are preferred, and lauryl methacrylate and octyl methacrylate are more preferred as the compound represented by Formula (I).

The grafted mass of the above-described component (C) in the modified polyolefin resin is preferably 0.1 mass % to 10 mass %, more preferably 0.5 mass % to 4 mass % when the modified polyolefin resin is taken as 100 mass %. As a result of the grafted mass being 0.1 mass % or more, the distribution of the molecular weight of the modified polyolefin resin can be maintained in a sufficiently narrow range and the decrease in molecular weight during graft modification can be suppressed. Thus, the adverse effect of the adhesive strength when a high molecular weight is inappropriate is prevented, and satisfactory solubility in solvents, low-temperature stability of solution, and compatibility with other resins can be maintained. Further, the adverse effect of low-molecular portions can be prevented and the adhesive strength can be increased. As a result of the grafted mass being 10 mass % or less, the generation of ungrafted reaction product can be prevented and satisfactory adhesivity to the resin adhesion object can be maintained. The grafted mass (%) of the component (C) can be measured by a well-known method. For example, it can be determined by a Fourier transform IR spectroscopy or $^1$H-NMR (proton nuclear magnetic resonance).

It is preferred that either one of the grafted mass of the component (B) and the grafted mass of the component (C) in the modified polyolefin resin be 0.1 mass % to 10 mass %, and it is more preferred that each of the grafted masses be 0.1 mass % to 10 mass %. In the present invention, grafted components other than the component (B) and the component (C) can be also used, according to the application or object, within ranges in which properties according to the present invention are not lost. Examples of the usable grafted components include (meth)acrylic acid derivatives other than (meth)acrylic acid and the component (C) (for example, N-methyl (meth)acrylamide, hydroxyethyl (meth)acrylamide, and (meth)acryloyl morpholine). The grafted components other than the components (B) and (C) in the modified polyolefin resin may be used individually or as a combination of a plurality thereof. It is preferred that the total grafted mass thereof does not exceed the total grafted mass of the components (B) and (C).

A radical generator necessary for graft polymerization, which is a component (D), can be selected, as appropriate, from among well-known radical generators, and an organic peroxide is preferred. Examples of organic peroxide-based compounds include di-t-butyl peroxide, dicumyl peroxide, t-butyl cumyl peroxide, benzoyl peroxide, dilauryl peroxide, cumene hydroperoxide, t-butyl hydroperoxide, 1,4-bis[(t-butylperoxy)isopropyl] benzene, 1,1-bis(t-butylperoxy)-3,5,5-trimethylcyclohexane, 1,1-bis(t-butylperoxy)-cyclohexane, cyclohexanone peroxide, t-butyl peroxybenzoate, t-butyl peroxyisobutyrate, t-butyl peroxy-3,5,5-trimethylhexanoate, t-butyl peroxy-2-ethylhexanoate, t-butyl peroxyisopropyl carbonate, and cumyl peroxyoctoate, and the preferred among them are di-t-butyl peroxide, dicumyl peroxide, and dilauryl peroxide. The component (D) may be an individual radical generator or may be a combination of a plurality of radical generators.

The amount added of the component (D) in the graft polymerization reaction is preferably 1 mass % to 100 mass %, more preferably 10 mass % to 50 mass % with respect to a total (mass) of the amount added of the component (B) and the amount added of the component (C). As a result of the amount added of the component (D) being 1 mass % or more, sufficient grafting efficiency can be maintained. As a result of the amount added being 100 mass % or less, the decrease in the weight-average molecular weight of the modified polyolefin-based resin can be prevented.

The graft polymerization may be performed in a state in which the copolymer-type polyolefin serving as the base material is thermally melted or in a state in which it is dissolved or dispersed in an organic solvent or water. Examples of suitable organic solvents include aromatic solvents such as toluene and xylene and alicyclic solvents such as methyl cyclohexane and ethyl cyclohexane. Polar solvents such as ester-based solvents and ketone-based solvents can be additionally used within a range in which the solution properties are not lost. A well-known method can be used for dispersing in water, but it is desirable that other components such as an emulsifier be not included at all.

The weight-average molecular weight of the modified polyolefin resin is 100,000 to 200,000, preferably 110,000 to 190,000, even more preferably 120,000 to 180,000. As a result of the weight-average molecular weight being 100,000 or more, it is possible to obtain strong adhesivity to polar resins and nonpolar resins. As a result of the weight-average molecular weight being 200,000 or less, it is possible to obtain sufficient solubility in solvents when an adhesive is used. The weight-average molecular weight in the present invention, including the examples, is a value measured and calculated by gel permeation chromatography (standard substance: polystyrene).

The modified polyolefin resin with a melting point (referred to hereinbelow as Tm) of 70° C. to 150° C., as determined with a differential scanning calorimeter (DSC), can be used. Assuming that the modified polyolefin resin layer is obtained by using a single modified polyolefin resin, a resin with a melting point of 70° C. to 110° C. is preferred. Basically, where the melting point is 70° C. or more, a high strength of adhesive bonding can be obtained, and where the melting point is 150° C. or less, satisfactory solution stability is obtained. Where a modified polyolefin resin with a low melting point is mixed with a modified polyolefin resin with a high melting point to obtain a weighted average melting point thereof of 70° C. to 110° C., the results identical to those obtained when the abovementioned individual resin is used can be obtained. Likewise, by mixing one or more of modified polyolefin resins with other resins (thermoplastic resins which are not a modified polyolefin resin), it is possible in some cases to obtain the results close to those obtained when the abovementioned individual resin is used, provided that the weighted average of the melting points of the resins is 70° C. to 110° C.

The Tm is measured with a DSC in the present invention, for example, under the following conditions. According to JIS K7121-1987, a DSC (differential scanning calorimeter: manufactured by Hitachi High-Tech Science Corporation (headquarters: Tokyo, Japan)) is used, about 5 mg of a sample is held for 10 min in a heated and melted state at 150° C., and the temperature is then lowered at a rate of 10° C./min and stably maintained at −50° C. Then, the temperature is raised at 10° C./min to 150° C., a melting peak temperature at the time of melting is measured and this temperature is evaluated as the Tm. The Tm in the below-described examples was measured under the above-described conditions.

[Polypropylene-Based Resin Composition: Injected Resin (Lamination Material)]

The polypropylene-based resin composition of the present invention is a resin layer or a molded article composed of a polypropylene-based resin composition which has been laminated by injection molding on the upper layer of the above-described modified polyolefin resin layer (second coat material). In the polypropylene-based resin composition which is used in the present invention, a commercially available typical polypropylene-based resin for injection molding can be used as the main material. A polypropylene-based resin composition is usually used by inserting a shaped metal article on which a modified polyolefin resin layer, which is the above-described second coat material, has been formed into an injection molding die and injecting the polypropylene-based resin composition. More specifically, the polypropylene-based resin composition can be of any type selected from a homo-type polypropylene resin, a random-type polypropylene resin, and a block-type polypropylene resin, each having a GF content of 0 mass % to 50 mass %.

[Glass Fiber Reinforced Thermoplastic Plastic (GFRTP): (Lamination Material)]

The glass fiber reinforced thermoplastic plastic (GFRTP), as referred to in the present invention, is laminated and integrally joined with (fixedly attached to) the shaped metal article by injection molding on the upper layer of the above-described modified polyolefin resin layer (second coat material). The glass fiber reinforced thermoplastic plastic (GFRTP), as referred to in the present invention, is a general-use typical composite material in which fibers mainly based on glass fibers are introduced into a plastic to increase the strength thereof. In particular, the glass fiber reinforced thermoplastic plastic (GFRTP) which is used in the present invention uses a polypropylene-based resin as the matrix resin of the composite material. The reason for using a polypropylene-based resin is to increase adhesivity (fixing ability) to the abovementioned modified polyolefin resin.

Advantageous Effects of Invention

With the multilayer composite body of a metal and a polypropylene-based resin composition of the present invention and a method for producing the same, it is possible to obtain a multilayer composite body with excellent fixing strength (shear breaking stress) between a shaped metal article and a polypropylene-based resin composition. Further, with the multilayer composite body of a metal and a polypropylene-based resin composition of the present invention and a method for producing the same, it is possible to obtain a multilayer composite body with excellent fixing strength between a metal and a PP-based GFRTP molded article.

BRIEF DESCRIPTION OF DRAWINGS

FIG. 2 illustrates an example of a PP-based stamping molded article, FIG. 2(a) is a perspective external appearance view, and FIG. 2(b) is a cross-sectional view of the article depicted in FIG. 2(a).

FIG. 3 is a cross-sectional view illustrating the interior of an injection molding die during molding of the multilayer composite body of the present invention.

DESCRIPTION OF EMBODIMENTS

Figure 1:
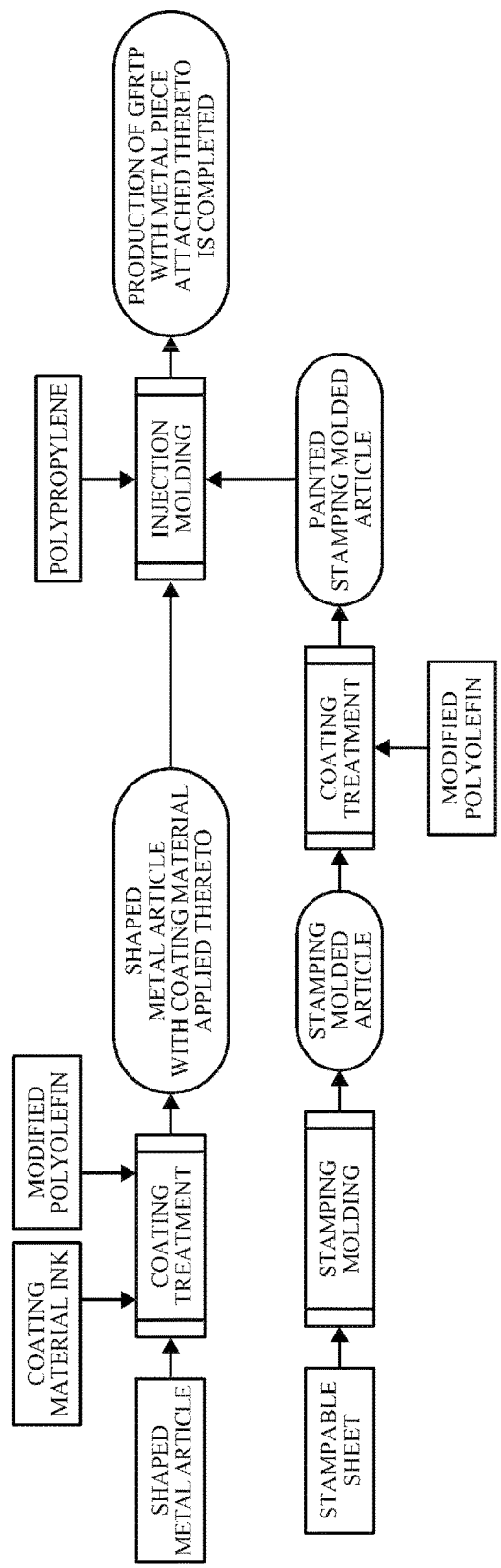
FIG. 1 illustrates an example of the outline of a process for producing a multilayer composite body of the present invention in which a metal, a polypropylene-based resin composition, and a GFRTP are laminated; this figure illustrates the flow of each production step.

Embodiments of the method for producing the first and second multilayer composite bodies of a metal and a polypropylene-based resin composition of the present invention will be explained hereinbelow in greater detail.

(1) A method for producing the first multilayer composite body of a metal and a polypropylene-based resin composition The first multilayer composite body of a metal and a polypropylene-based resin composition of the present invention is a laminate of a shaped metal article, a first coat material, a second coat material, and an injection-molded polypropylene-based resin composition.

A method for producing the first multilayer composite body of a metal and a polypropylene-based resin composition of the present invention (see FIG. 5) is outlined by the following Steps 1 to 4. Step 1: a step of preparing a shaped metal article subjected to the above-described mechanical processing, or the like. Step 2: a step of coating a paint, ink, or the like, composed of a urethane resin or an epoxy resin as the main material on the shaped metal article, heating, and semi-curing to form a thermosetting resin layer which is the first coat material. Step 3: a step of coating a resin coat material including a specific modified polyolefin resin, which is the second coat material, on the thermosetting resin layer which has been semi-cured in Step 2, curing the thermosetting resin layer by heating, and at the same time, melting and fixedly attaching the modified polyolefin resin layer. Step 4: a step of inserting the shaped metal article to which the two coating film layers have been attached and which has been obtained in Step 3 into an injection molding die and injection molding a polypropylene-based resin composition on the first coat material and second coat material layer.

In the step for preparing the shaped metal article, which is Step 1, it is preferred that a shaped metal article be used which has been subjected to surface roughening or surface roughening involving conversion treatment, as described hereinabove, in order to improve adhesion between the shaped metal article and a polar resin layer which is to be formed on the surface thereof. In Step 2, a coat material which is a thermosetting resin is coated on the surface of the shaped metal article and heated to form a semi-cured resin layer. Step 2 serves for coating the shaped metal article with an ink or a paint of a two-pack urethane curable resin or one- or two-pack epoxy resin, or dip coating therewith, heating, for example, at 60° C. or less, to volatilize most of the solvent, and then treating at a temperature of about 20° C. which is about the room temperature and is lower than a typical curing temperature of the ink or paint, thereby retaining the urethane curable resin or epoxy resin in the semi-cured state.

Step 3 serves for coating a solution of an adhesive composition including a specific modified polyolefin resin on the thermosetting resin layer which is composed mainly of the urethane resin or epoxy resin and has been semi-cured in Step 2, heating by raising the temperature to a temperature higher than the melting point of the modified polyolefin resin, thereby further curing the semi-cured urethane resin layer or epoxy resin layer and, at the same time, melting the modified polyolefin resin, and then solidifying and fixedly attaching by allowing to cool.

The modified polyolefin resin, which is used in Step 3, is a modified polyolefin resin in which an α,β-unsaturated carboxylic acid or a derivative of the α,β-unsaturated carboxylic acid (B) and a (meth)acrylic acid ester (C) are graft polymerized onto the above-mentioned copolymer-type polyolefin (A) as a base material, the modified polyolefin resin having a weight-average molecular weight of 100,000 to 200,000 and a melting point of 70° C. to 110° C., as determined with a differential scanning calorimeter (DSC), or a mixture of two or more of modified polyolefin resins with a weighted average of melting points of 70° C. to 110° C.

In Step 4, the shaped metal article subjected to two-layer coating treatment and obtained in Step 3 is inserted in an injection molding die and a polypropylene-based resin composition is injection molded on the coating surface, thereby obtaining an injection-joined article which is a multilayer composite body of a metal and a polypropylene-based resin composition. The molding conditions, such as a die temperature and an injection temperature, in the injection molding are not different from the injection molding conditions of typical polypropylene-based resins. In other words, it is preferred that the die temperature be adjusted to a rather high temperature of 80° C. to 100° C. and the injection temperature be adjusted to a rather high temperature of about 260° C. to 280° C. In theory, by further increasing the two temperatures, it is possible to obtain a multilayer composite body having more stable adhesivity, but where the die temperature is made 100° C. or higher, a runner is difficult to separate and continuous injection operations are difficult to perform. Where the injection temperature is further increased, the so-called stringing and drooling tend to occur.

Figure 10:
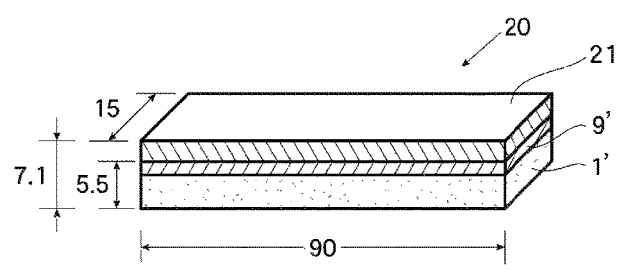
FIG. 10 is an external appearance view of an intermediate product of a measurement piece for measuring a fixing strength between a thin metal sheet portion and a PP-based GFRTP in the multilayer composite body fabricated in Test Example 1.

(2) Outline of Process for Producing the Second Multilayer Composite Body of a Metal and a PP-Based GFRTP Molded Article The second multilayer composite body of a metal and a polypropylene-based resin composition is a laminate of a shaped metal article, a first coat material, a second coat material, and a PP-based GFRTP molded article joined (fixedly attached) by injection molding (see FIG. 10).

FIG. 1 is a block diagram illustrating an example outlining the process for producing a multilayer composite body of a metal and a GFRTP molded article of the present invention. As depicted in FIG. 1, prepared separately are a shaped metal article obtained by mechanical processing of a metal material, which is a source material, into the desired shape and a stampable sheet from a GFRTP. The stampable sheet, as referred to in the present invention, is a plastic material obtained by molding a thermoplastic resin which is mainly PP and glass fibers into a sheet by a papermaking technique. The stampable sheet from a PP-based GFRTP is processed in separate steps and integrated in an injection joining step performed with an injection molding machine which is the final step. For this reason, the below-described metal material with a coating film attached thereto and a stamping-molded article need to be prepared separately before inserting into an injection molding die for integration in the injection joining step. The resin to be injected in the injection joining step which is the final step in producing the multilayer composite body usually may be a general-use commercially available product of a PP-based composition. Therefore, the PP injection joining technique disclosed and suggested by the inventors of the present application et al. (for example, PI" 1) can be used, as is, as the injection joining technique.

Initially, in the case of the second multilayer composite body of a metal and a polypropylene-based resin composition of the present invention, the surface of a shaped metal article molded by mechanically processing a metal, which is a source material, for example, an aluminum alloy, is roughened by a well-known processing method such as sandblasting and chemical polishing. After the surface has been washed, a thermosetting resin layer coat material composed of an urethane curable ink or an epoxy resin is coated thereon, and a coat material of a specific modified polyolefin resin is then coated to obtain a painted metal material having a two-layer coating surface. Up to the step of obtaining the painted metal material having the two-layer coating surface, the process for producing the second multilayer composite body of a metal and a polypropylene-based resin composition of the present invention is the same as the process for producing the first multilayer composite body of a metal and a polypropylene-based resin composition.

In the production of a second multilayer composite body of a metal and PP of the present invention, a shaped metal article having a two-layer coating surface is initially fabricated and prepared by the above-described method. A stampable sheet is prepared separately from this shaped metal article for the second multilayer composite body of a metal and a polypropylene-based resin composition of the present invention. The stampable sheet, as referred to in the present invention, is a well-known plastic material obtained by molding PP, which is a thermoplastic resin, and glass fibers into a sheet by a papermaking technique. Such stampable sheets have excellent processability, that is, can be molded by low-pressure cold pressing, hot pressing, or the like, without melting the resin, and have been used in part as internal trim members for automobiles and the like. Stamping molded articles of a predetermined shape are obtained by using stamping molding of the stampable sheets which have already been commercialized and put to practical use.

However, the stamping molded article that can be used in the present invention is not limited to the PP-based stampable sheet. Other molded articles may be used, provided that they are PP-based GFRTP. Thus, not only stampable sheets produced by a papermaking method, but also sheets obtained by molding a homogeneously stirred particulate PP-based resin and glass fibers in a die, or the like, sheets obtained by laminating a plurality of stampable sheets and partially mechanically joining the laminated sheets, sheets thermally fused together, and sheets ultrasonically joined together can be used. Therefore, the PP-based GFRTP, as referred to in the present invention, means a PP-based stampable sheet, a multilayer body thereof, a molded article, and the like. Further, the final product which is the multilayer composite body of a metal and a polypropylene-based resin composition is obtained by preparing a PP-based GFRTP molded article obtained by molding the PP-based GFRTP, preparing an injection molding die, inserting both the above-described shaped metal article provided with the two-layer coating surface and the PP-based GFRTP molded article into the die, and injecting PP thereinto.

Each production step of the first and second multilayer composite bodies of a metal and a polypropylene-based resin composition of the present invention will be explained hereinbelow in detail.

[I. Production of Painted Shaped Metal Article] (Treatment Common to the First and Second Multilayer Composite Bodies of a Metal and a Polypropylene-Based Resin Composition of the Present Invention)

[1. Shaped Metal Article and Surface Treatment Thereof]

In the present invention, the types of metal materials which can be source materials for the shaped metal article to be used in the multilayer composite body of the present invention are substantially not limited, and a magnesium alloy, an aluminum alloy, a titanium alloy, a copper alloy, a stainless steel, a general steel material, an aluminum-plated steel sheet, and the like, can be used. After the metal material has been processed into the required shaped article by mechanical processing, or the like, it is preferred that the fixing strength with a coat material, or the like, be increased by performing, for example, NAT treatment (for example, a surface-treated shape for adhesive bonding disclosed in WO 2008/114669 (A1), etc.), as prime processing. However, as will be described below, it may be also prime treatment such as general pretreatment of metals for coating.

In order to obtain a shear breaking stress of about 15 MPa as a bond strength of a shaped metal article and a PP-based resin composition which is to be joined thereto by injection molding, it is preferred that the surface of the shaped metal article be subjected to a typical chemical etching treatment or physical roughening treatment such as mechanical processing, e.g., blasting treatment or sandpaper polishing, same as the prime treatment for coating or the like. Where a shaped metal article is used for which a commercially available sheet metal material, extruded material, or the like has been used as an intermediate material, the adequate rough surface state can be in some cases obtained by performing degreasing to remove a mechanical oil, a finger oil, or the like, from the surface thereof, and then washing with water and drying.

(Mechanism of Two-Layer Coating Including Modified Polyolefin Coating Film (Second Coat))

The reason for obtaining the desired molded article by injecting a PP-based resin composition onto the shaped metal article that has been subjected to the aforementioned treatment and then two-layer coated with the first coat and second coat is explained below. When the PP-based resin composition which has been injected and melted after the shaped metal article provided with the two-layer coating surface was inserted into the injection molding die approaches the surface of the shaped metal article, the melted PP-based resin composition melts part of the modified polyolefin layer of the surface layer and moves inward while taking in the melted modified polyolefin. In this case, where the entire modified polyolefin is taken in by the molten PP-based resin composition, the fixing strength is weakened, but as a result of using the modified polyolefin with a branched chain obtained by graft polymerization of an acrylic monomer or maleic anhydride or a derivative thereof, the fixing strength is demonstrated because some chemical bonding occurs between the modified polyolefin itself of the upper layer of the metal material and the prime layer (in this case, the urethane curable coating film layer or an epoxy resin coating film layer).

Further, when a modified polyolefin with a melting point of 140° C. to 150° C. is used so as to prevent the modified polyolefin layer from eluting when the modified polyolefin resin comes into contact with the molten PP-based resin composition, the adhesive strength at the interface of the PP-based resin composition and the modified polyolefin becomes insufficient. When a modified polyolefin with a melting point of 70° C. or less is used, the modified polyolefin is immediately eluted upon contact with the molten PP-based resin composition and absorbed by the molten PP-based resin composition. For this reason, in the present invention, it is preferred that a modified polyolefin with a melting point of 70° C. to 110° C. be used.

Further, as a result of using a modified polyolefin with a weight-average molecular weight of 100,000 to 200,000, a high fixing strength with a metal is demonstrated. This is supposedly because when the weight-average molecular weight is 100,000 or less, even when the melting point is 70° C. to 110° C., the molecule length is small which results in a low melt viscosity and elution upon contact with the molten PP. When a modified polyolefin with a melting point of 70° C. to 110° C. and a weight-average molecular weight of 100,000 to 200,000 or a combination of two or more of modified polyolefins with a weighted average of melting points of 70° C. to 110° C. is used, a high fixing strength (shear breaking force) of 12 MPa or higher is stably demonstrated between the metal and the PP-based resin composition when a typical GF-containing PP-based resin composition is injection joined.

After the thermosetting resin layer, which is a prime layer, has been semi-cured, a coat liquid from the modified polyolefin is coated, without a large delay, on the semi-cured thermosetting resin layer, and the solvent is vaporized over about 10 min at 55° C. The temperature is then raised, heating is performed for about 15 min at 110° C. to 120° C., and the coating is then allowed to cool. Thus, although the aforementioned temperature is not limiting, such temperature and time conditions ensure complete curing of the urethane-based ink of the prime layer. At the same time, the temperature may be higher than the melting point of the modified polyolefin resin used as the top coat. Under such temperature conditions, the prime urethane-based ink layer is completely cured and the modified polyolefin layer is melted and fixedly attached. Examples of the two-pack urethane-based paints used by the inventors of the present application et al. include "SG740 Clear (manufactured by Seiko Advance Ltd.; headquarters: Tokyo, Japan)" and "VIC (manufactured by Seiko Advance Ltd.)".

[II. Molding of Stampable Sheet (Glass Fiber Reinforced Thermoplastic Plastic (GFRTP))] (Method for Producing Second Multilayer Composite Body of a Metal and a Polypropylene-Based Resin Composition of the Present Invention)

The glass fiber reinforced thermoplastic plastic (GFRTP) of the present invention is a glass fiber reinforced thermoplastic plastic including a PP-based resin composition as a matrix resin (referred to hereinbelow also as PP-based GFRTP). The PP-based GFRTP used in the present invention can be exemplified by a stampable sheet, but this example is not limiting. A stampable sheet is obtained by dispersing powdered PP and glass fibers with a length from several cm to 10 cm in water, adding an auxiliary agent thereto, lift-drying with a net-like material as in papermaking, heating to the melting point of PP or a higher temperature to obtain a paper-like article, and then laminating several such articles to obtain a sheet. The proportion of the mass of the glass fibers in the total mass of the stampable sheet is usually about 50%. Since the length of the glass fibers is much larger than the length of 0.5 mm to 1 mm of the usual fibers which are mixed with PP pellets for injection molding, a molded article which is incomparably more durable than injection molded articles can be obtained by stamping molding of the stampable sheet.

The required amount of the PP-based stampable sheet was taken into a container and heated and melted at 190° C. to 200° C. in a heating furnace to obtain a soft dumpling shape. The stampable sheet was then loaded into a press die and immediately pressurized. The press pressure was, for example, 5 MPa per press surface area. The press machine used in the below-described tests by the inventors of the present application et al. was a compact press machine. In an example of such press, a small mold for plate-shaped articles had a cavity of about 100 mm×100 mm×(3 to 5) mm. The heated stampable sheet was loaded into the molding die at a normal temperature, without setting the temperature. The interval of sealing portions in the gap between the upper mold and lower mold of the molding die used in the molding process had the design value of the gap of 0.1 mm, and the molding die was fabricated by the same processing method as used for producing the injection molding dies.

(Shape of Stamping Molded Article)

FIG. 2 shows an example of the stamping molded article. FIG. 2(*a*) is a perspective external appearance view of the stamping molded article, and FIG. 2(*b*) is a cross-sectional view of the article depicted in FIG. 2(*a*). The stamping molded article 1 of the present example is obtained by laminating and molding a plurality of sheets and has a thick rectangular shape. A plurality of circumferential-surface protrusions 2 is formed at the outer circumferential surface of the stamping molded article 1. A plurality of side-surface protrusions 3 is formed at one side surface of the stamping molded article 1. Two through holes 4 are formed in the central portion of the stamping molded article 1.

FIG. 3 is a cross-sectional view illustrating the interior of the injection molding die during molding of the multilayer composite body of the present invention. Thus, this cross-sectional view of the die outlines a shaped metal article 9 and the stamping molded article 1 inserted into the injection molding die when molding the second multilayer composite body, this view showing a state in which the die is closed. An injection molding die 10 used in the present invention has a typical structure composed of a fixed mold plate 11, a movable mold plate 12, and a sprue bush. The aforementioned shaped metal article 9 with the above-described two-layer coat and the stamping molded article 1 are inserted in a stacked configuration into a cavity 13 compartmentalized in the movable mold plate 12. When the injection molding die 10 is closed, a gap 14 is compartmentalized and formed between the shaped metal article 9 and the stamping molded article 1 because the side-surface protrusions 3 and the circumferential-surface protrusions 2 have been formed at the stamping molded article 1.

Meanwhile, a molten PP resin is injected from a nozzle of the injection molding machine into the injection molding die 10. This molten resin passes from a sprue 15 through a gate 16, enters the through holes 4 of the stamping molded article 1, and penetrates further into the gap 14. As a result, the molten PP resin fills the gap 14 between the shaped metal article 9 and the stamping molded article 1 and fills the side of the stamping molded article 1 and one side of the shaped metal article 9. As a result, the injected PP is joined to both the stamping molded article 1 and the shaped metal article 9 and integrates them. In other words, the injected PP serves as both an adhesive and a filler. The shape of the stamping molded article 1 of the present example is such that the through holes 4, the circumferential-surface protrusions 2, and the side-surface protrusions 3 are formed in specific locations of the stamping molded article 1 and the molten resin flows smoothly inside the cavity 13. Therefore, the resin can flow and solidify such as to conceal the stamping molded article 1, and the contact thereof with the shaped metal article 9 can be realized while the molten PP is still at a high temperature.

Figure 4:
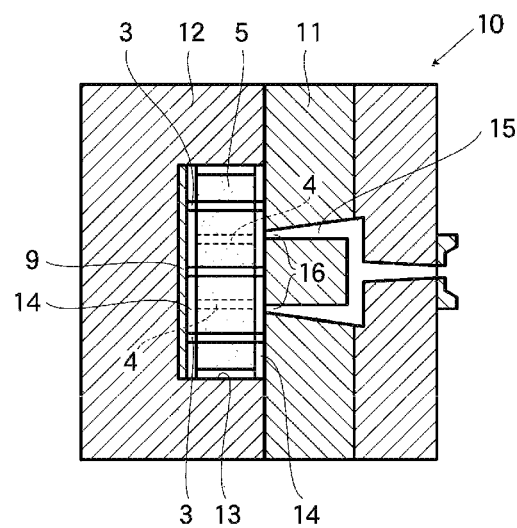
FIG. 4 is a cross-sectional view illustrating the interior of an injection molding die in the case of molding the multilayer composite body of the present invention when a PP-based stamping molded article of a different shape is used.

Accordingly, the shaped metal article 9 that was two-layer coated based on the above-described principle and the injected PP could be strongly joined to each other, and the outer circumference of the stamping molded article 1 could be also molded to the desired shape. FIG. 4 is a cross-sectional view illustrating the interior of the injection molding die in the case of molding the second multilayer composite body of the present invention when a stamping molded article of a different shape is used. In a stamping molded article 5, a protrusion is formed on the entire outer circumferential surface and a gap 14 is formed also between the stamping molded article and the cavity 13. Thus, in the multilayer composite body (not depicted in the figure) molded using the stamping molded article 5, the entire surface of the stamping molded article 5 is covered with PP.

(Coating of Coat Material on Stamping Molded Article)

Coating a coat material on the stamping molded article is not necessarily an essential step. However, this step is implemented when a high bond strength is needed between the stamping molded article inserted into the injection molding die and the injected PP. As mentioned hereinabove, in the final step, the stamping molded article is inserted and the PP resin is injected into the injection molding die, and the stamping molded article and the injected PP resin are thermally fused together. The injected PP resin and the PP resin molded article (stamping molded article) which has already solidified cannot be easily thermally fused together, but where the temperature of the injection molding die is set several tens of Celsius degrees higher than that during the usual PP injection molding, the inserted PP molded article and the injected PP resin are thermally fused together.

However, a problem arising where the die temperature is set, for example, to 90° C. or higher (in the usual PP molding, it is 50° C. to 60° C.) and the injection temperature is also somewhat increased, is that when the molded product is removed from the injection molding die, an automatic take-out device is difficult to use and high-volume production is difficult to realize because of a high temperature of the molded product. In this regard, as a result of coating, drying, and baking a coat liquid from a modified polyolefin resin on the stamping molded article before inserting into the injection molding die, the temperature of the injection molding die can be set within the usual range and the occurrence of the abovementioned problem can be prevented.

(Modified Polyolefin Resin Coat Material)

The aforementioned modified polyolefin resin which has a weight-average molecular weight of 100,000 to 200,000 and a melting point of 70° C. to 110° C., as determined with a differential scanning calorimeter (DSC), and in which an α,β-unsaturated carboxylic acid or a derivative thereof and a (meth)acrylic acid ester are graft polymerized onto the above-described copolymer-type polypropylene as a base material, or a mixture of two or more of modified polyolefin resins with a weighted average of melting points of 70° C. to 110° C. can be used as the coat material to be coated on the stamping molded article, and a paint obtain by dissolving such modified polyolefin resin in toluene or an organic solvent including toluene can be used as a coat liquid. The coat liquid is coated on the entire or necessary surface of the stamping molded article, dried in air, and then treated for about 15 min at 110° C. to 120° C. with a warm air dryer. In the modified polyolefin resin, graft polymerization is performed onto a PP resin as a base material, and because of a high affinity for the PP molded article, the prime paint can be in the form of a single layer.

[III. Injection Joining Step]

Upon completion of the operation of coating the modified polyolefin resin described in the previous step on the stamping molded article which has been obtained in the above-described stamping step and subjected to processing such as necessary shape correction, for example, the removal of unnecessary burrs by cutting and drilling, the molded article is transferred to the injection joining step. The above-described shaped metal article subjected to the two-layer coat treatment is also transferred to the injection joining step. As depicted in FIG. 3, the aforementioned two-layer-coated shaped metal article 9 and the stamping molded article 1 are laminated and inserted into the cavity 13 compartmentalized in the movable mold plate 12. The molten resin passes from the sprue 15 through the gate 16, enters the through holes 4 of the stamping molded article 1, and penetrates further into the gap (about 0.5 mm to about 11.0 mm) 14. As a result, the molten PP resin fills the gap 14 between the shaped metal article 9 and the stamping molded article 1 and fills the side of the stamping molded article 1.

As a result, the injected PP is injection joined to both the stamping molded article 1 and the shaped metal article 9 and integrates them. However, with such an arrangement configuration inside the injection molding die 10, the molten PP resin hardly flows to the rear surface side (the surface on the gate 16 side which is not the metal surface) of the final product (integrated article separated from the die), and this rear surface side is exposed as the stamping molded article 1, without being covered. The stamping molded article 5 depicted in FIG. 4 is obtained by forming a gap 14 also in the rear surface portion and allowing the injected PP resin to flow into this gap 14. In this example, protrusions are formed on both the front surface and the rear surface of the stamping molded article 5. As for the injection molding conditions of the PP resin, it is preferred that the die temperature be adjusted to be slightly raised to, for example, 80° C., and that the injection temperature of the molten resin be adjusted to be slightly raised to, for example, about 190° C. In theory, by further increasing the two temperatures, it is possible to obtain a multilayer composite body having more stable adhesivity. However, as mentioned hereinabove, where the die temperature is made too high, for example, 100° C. or higher, a runner is difficult to separate and continuous injection molding is difficult to perform. Where the injection temperature is further increased, the so-called drooling occurs.

EXAMPLES

Examples of the first and second multilayer composite bodies of a metal and a polypropylene-based resin composition of the present invention, which have been explained in the embodiments, and the manufacturing method thereof will be explained hereinbelow. Equipment used in these tests is described below.

(a) Measurement of Bond Strength (Tensile Breaking Strength) of the Multilayer Composite Body A load measuring device "MODEL-1323VR (manufactured by Aikoh Engineering Co., Ltd. (headquarters: Osaka, Japan))" was used, and the tensile shear breaking force was measured at a tension rate of 10 mm/min.

(b) Press used for press operation A compact press "MINITEST PRESS (model: MP-WCH, manufactured by Toyo Seiki Seisaku-Sho, Ltd. (headquarters: Tokyo, Japan))" was used.

[1. Example of the First Multilayer Composite Body of a Metal and a Polypropylene-Based Resin Composition of the Present Invention]

Figure 5:
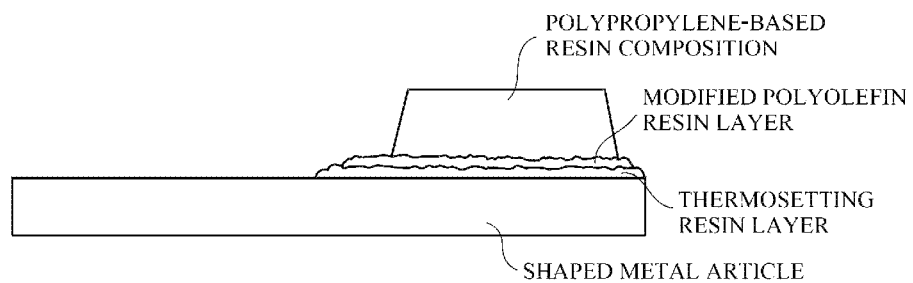
FIG. 5 is an external appearance view schematically illustrating the basic structure of the multilayer composite body of a metal and a polypropylene-based resin composition of the present invention.
Figure 6:
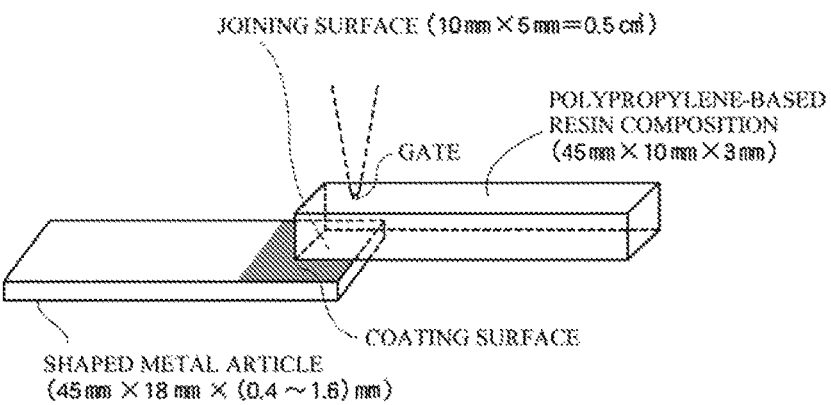
FIG. 6 is a detailed view illustrating the shape of a multilayer composite body for measuring the fixing strength thereof, this multilayer composite body being the testpiece of a multilayer composite body of a metal piece (shaped metal article) and a polypropylene-based resin composition.
Figure 7:
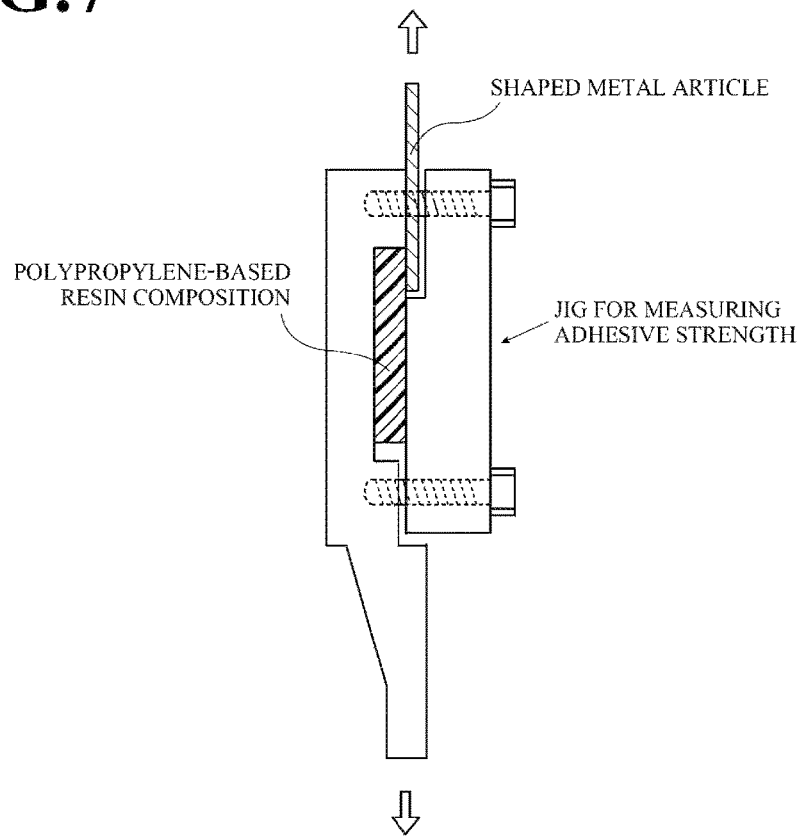
FIG. 7 illustrates the external appearance of a jig for measuring the shear breaking stress for measuring the fixing strength of the testpiece.
Figure 8:
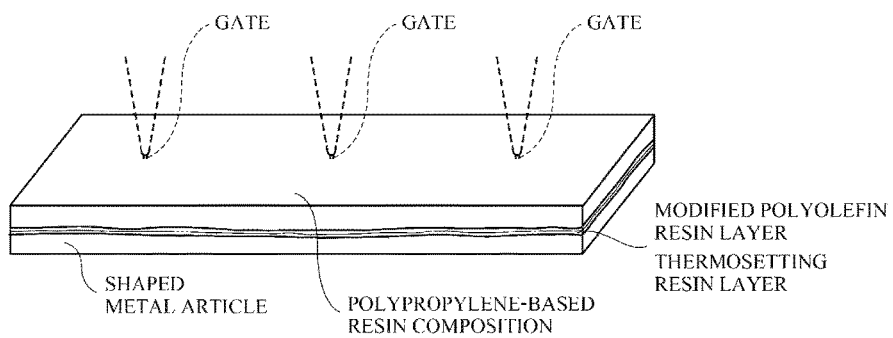
FIG. 8 illustrates an example of a multilayer body in which a metal and a resin are laminated, this multilayer body being a multilayer composite body of the present invention.
Figure 9:
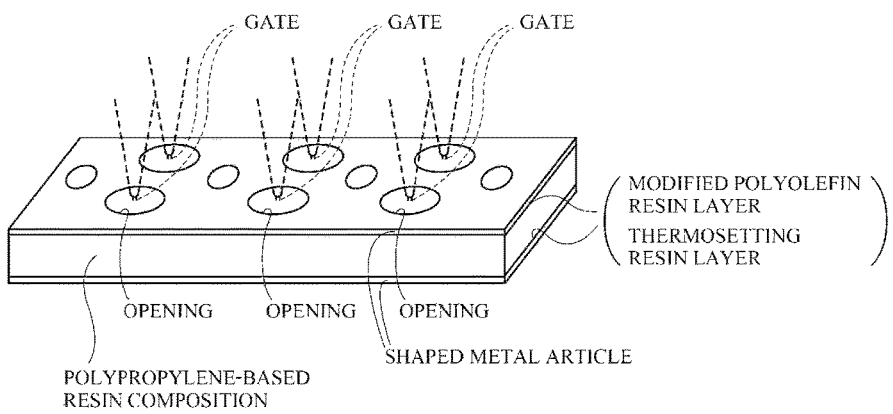
FIG. 9 illustrates an example of a multilayer body in which shaped metal articles as two surface layers and a polypropylene-based resin composition therebetween are laminated as three layers, this multilayer body being the multilayer composite body of the present invention.

Test examples of the present invention will be described hereinbelow as examples. FIG. 5 is an external appearance view schematically illustrating the basic structure of the first multilayer composite body of a metal and a polypropylene-based resin composition of the present invention. FIG. 6 is a detailed view illustrating the shape of a multilayer composite body for measuring the adhesive strength thereof, this body being a testpiece for measuring the adhesive (fixing) strength of a multilayer composite body of a shaped metal article and a polypropylene-based resin composition. FIG. 7 illustrates the external appearance of a jig for measuring the shear breaking stress for measuring the fixing strength of the testpiece. FIG. 8 illustrates an example of a multilayer body in which a metal and a resin are laminated, this multilayer body being a multilayer composite body of the present invention. FIG. 9 illustrates an example of a multilayer body in which shaped metal articles as two surface layers and a polypropylene-based resin composition therebetween are laminated as three layers, this multilayer body being the multilayer composite body of the present invention.

Example 1

Steps 1 to 4 explained hereinbelow are generally explained in a method for producing the first multilayer composite body of the above-described metal and polypropylene-based resin composition. Specific examples of the steps are presented below.
(Step 1)
An A5052 aluminum alloy sheet with a thickness of 1.6 mm was acquired, and the alloy sheet was cut into a large number of 45 mm×18 mm aluminum alloy pieces (testpieces). An aqueous solution (liquid temperature 60° C.) including 7.5% of a degreasing agent "NE-6" for aluminum (manufactured by Meltex Inc., headquarters: Tokyo, Japan) was prepared and used as a degreasing solution in a degreasing tank. The cut aluminum alloy pieces were Immersed in the degreasing tank for 5 min and then washed with water. An aqueous solution (liquid temperature 40° C.) including 1% of hydrochloric acid was prepared in a tank separate from the degreasing tank and this tank was used as a pre-pickling tank. The aluminum alloy pieces were immersed for 1 min in the pre-pickling tank and then washed with water for cleaning. An aqueous solution (liquid temperature 40° C.) including 1.5% of caustic soda was prepared in yet another tank as an etching solution and this tank was used as an etching tank. The aluminum alloy pieces were immersed for 10 min in the etching tank and then washed with water for cleaning. An aqueous solution of nitric acid with a concentration of 3% (liquid temperature 40° C.) was prepared in yet another tank, and this tank was used as a pickling tank. The aluminum alloy pieces were Immersed for 3 min in the pickling tank, washed with water for cleaning, and then dried with a warm air dryer. Roughened aluminum alloy pieces were thus obtained.
(Step 2)
An urethane-based, two-pack isocyanate-curable ink "SG740" (manufactured by Seiko Advance Ltd., headquarters: Tokyo, Japan), a curing agent, and a solvent were prepared at a mixing ratio recommended by the manufacturer, a brush was saturated with the liquid mixture, and a portion of about 10 mm at one end of the roughened aluminum alloy pieces was coated. The coated pieces were arranged side by side on top of a corrugated cardboard, and placed for 15 min in a warm air dryer set at 80° C. to volatilize the solvent in the ink, and the "SG740" layer was semi-cured.
(Step 3)
Next, the modified polyolefin resin 1 was dissolved in a methylcyclohexane/MEK mixed solvent (8:2 mixed solvent), the solution was used as a coating liquid, the coating liquid was poured on a glass dish to saturate a brush, and the coating liquid was coated with the brush on the coating film obtained by semi-curing the urethane-based, two-pack isocyanate-curable ink on the end portion of the aluminum alloy pieces. The testpieces were then placed for 15 min in a warm air dryer set at 60° C. to volatilize the solvent in the ink, placed for 15 min in a hot air dryer set at 110° C., taken out, and allowed to cool.
<Production of Modified Polyolefin Resin 1>
In a four-neck flask fitted with a stirrer, a cooling tube, and a dropping funnel, 100 parts by mass of ethylene copolymer-type polypropylene (propylene component 88 mol %, ethylene component 12 mol %, weight-average molecular weight 150,000, Tm=72° C.) was dissolved under heating in 400 g of toluene. Then, 1.5 part by mass of maleic anhydride, 1.5 part by mass of lauryl methacrylate, 0.3 part by mass of cyclohexyl methacrylate, and 1 part by mass of di-t-butyl peroxide were dropwise added over 3 hours under stirring, while maintaining the temperature in the system at 110° C., and the reaction was further conducted for 1 hour.

After the reaction, the reaction product was cooled to room temperature and then purified by charging into a large excess of acetone, thereby obtaining a modified polyolefin resin 1 which had a weight-average molecular weight of 125,000 and Tm=72° C. and had a grafted mass of maleic anhydride of 1.3 mass % and a total grafted mass of lauryl methacrylate and cyclohexyl methacrylate of 1.6 mass %. The grafted mass of maleic anhydride was measured by an alkali titration method, and the total grafted mass of lauryl methacrylate and cyclohexyl methacrylate was measured by $^1$H-NMR.
(Step 4)
The aluminum alloy pieces subjected to the steps of coating, melting, and cooling and solidifying the modified polyolefin resin were inserted in an injection molding die that was set to 80° C. or 100° C., and three types of polypropylene-based resin composition (homo type, random type, block type; manufactured by Prime Polymer Co., Ltd.) including 30% of glass fibers (GF) were injected at an injection temperature of 270° C. to obtain multilayer composite bodies of a metal and a polypropylene-based resin composition which are injection joined articles of the aluminum alloy pieces and polypropylene (see FIG. 6). The joining surface is 0.5 cm$^2$ (5 mm×10 mm). Next day, the obtained multilayer composite bodies were broken under tension with a tensile tester by using a jig for measuring a shear breaking stress shown in FIG. 7, and a shear breaking stress between the metal portion and the resin layer was measured. The results are shown in Table 1.

Example 2

A SUS304-2B sheet material with a thickness of 1.0 mm was acquired and cut into a large number of 45 mm×18 mm stainless steel pieces. An aqueous solution (liquid temperature 60° C.) including 7.5% of a degreasing agent "NE-6" for aluminum (manufactured by Meltex Inc., headquarters: Tokyo, Japan) was loaded in a degreasing tank. The alloy pieces were immersed in the degreasing tank for 5 min and then washed with water for cleaning. An aqueous solution (liquid temperature 40° C.) including 1.5% of caustic soda was prepared in a separate tank and this tank was used as a preliminary base washing tank. The stainless steel pieces were immersed for 1 min in the preliminary base washing tank and then washed with water for cleaning. An aqueous solution (liquid temperature 65° C.) including 1% of ammonium hydrogen difluoride and 5% of sulfuric acid was prepared in a separate tank, and this tank was used as an etching tank. The stainless steel pieces were immersed for 8 min in the etching tank and then washed with water for cleaning. An aqueous solution (liquid temperature 40° C.) of nitric acid with a concentration of 3% was prepared in a separate tank, and this tank was used as a pickling tank. The stainless steel pieces were immersed for 3 min in the neutralization tank which was the pickling tank, washed with water for cleaning, and dried with a warm air dryer.

The subsequent steps 2 to 4 were performed in exactly the same manner as in Example 1, and the fixing strength of the obtained injection joined article was measured. The results are shown in Table 1.

Example 3

The operations were performed in exactly the same manner as in Example 1, except that the modified polyolefin resin was changed to a resin in which the below-described modified polyolefin resin 2 and modified polyolefin resin 3 were mixed at a solid fraction mass ratio of 1:1. The fixing strength of the obtained injection joined article was measured. The results are shown in Table 1.

<Production of Modified Polyolefin Resin 2>

A total of 100 parts by mass of 1-butene copolymer-type polypropylene (propylene 70 mol %, 1-butene 30 mol %, weight-average molecular weight 250,000, Tm=65° C.), 3.5 parts by mass of maleic anhydride, 3.0 parts by mass of octyl methacrylate, 0.5 part by mass of 2-ethylhexyl methacrylate, and 2 parts by mass of dilauryl peroxide were kneaded and reacted by using a twin-screw extruder set at 170° C. Vacuum degassing was performed in the extruder to remove residual unreacted materials, thereby obtaining a modified polyolefin resin 2 which had a weight-average molecular weight of 180,000 and Tm=65° C. and had a grafted mass of maleic anhydride of 3.1 mass % and a total grafted mass of octyl methacrylate and 2-ethylhexyl methacrylate of 3.0 mass %.

<Production of Modified Polyolefin Resin 3>

In a four-neck flask fitted with a stirrer, a cooling tube, and a dropping funnel, 100 parts by mass of ethylene copolymer-type polypropylene (propylene 96 moil, ethylene 4 mol %, weight-average molecular weight 250,000, Tm=135° C.) was dissolved under heating in 400 g of xylene. Then, 1.5 part by mass of maleic anhydride and 1 part by mass of Perhexa (registered trademark) 25B (NOF Corporation (headquarters: Tokyo, Japan)) as an organic peroxide were dropwise added over 3 hours under stirring, while maintaining the temperature in the system at 140° C., and the reaction was further conducted for 1 hour. After the reaction, the reaction product was cooled to room temperature and then purified by charging into a large excess of acetone, thereby obtaining a modified polyolefin resin 3 which had a weight-average molecular weight of 120,000 and Tm=135° C. and also had a grafted mass of maleic anhydride of 0.7 mass %.

Example 4

The operations were performed in exactly the same manner as in Example 1, except that the modified polyolefin resin was changed to the below-described modified polyolefin resin 4. The fixing strength of the obtained injection joined article was measured. The results are shown in Table 1.

<Production of Modified Polyolefin Resin 4>

A total of 100 parts by mass of 1-butene copolymer-type polypropylene (propylene 80 mol %, 1-butene 20 mol %, weight-average molecular weight 250,000, Tm=88° C.), 3.5 parts by mass of maleic anhydride, 3.0 parts by mass of octyl methacrylate, 0.5 part by mass of 2-ethylhexyl methacrylate, and 2 parts by mass of dilauryl peroxide were kneaded and reacted by using a twin-screw extruder set at 170° C. Vacuum degassing was performed in the extruder to remove residual unreacted materials, thereby obtaining a modified polyolefin resin 4 which had a weight-average molecular weight of 180,000 and Tm=88° C. and also had a grafted mass of maleic anhydride of 3.1 mass % and a total grafted mass of octyl methacrylate and 2-ethylhexyl methacrylate of 3.0 mass %.

Example 5

A large number of 45 mm×18 mm small roughened aluminum alloy pieces from an A5052 aluminum alloy with a thickness of 1.6 mm were obtained by exactly the same processing as in Test Example 1. A brush was saturated with a one-pack modified epoxy curable paint "Nippe Power Bind Next (one-pack modified epoxy quick-drying universal primer paint)" (manufactured by NipponPaint Co., Ltd. (headquarters: Tokyo)), and a portion of about 10 mm at one end of the aluminum alloy pieces was coated. The coated pieces were arranged side by side on top of a corrugated cardboard, and placed for 15 min in a warm air dryer set at 80° C. to volatilize the solvent in the paint, and the coating layer was dried.

Next, the modified polyolefin coat material liquid and other coat material liquids were poured on a glass dish and coated with a brush on the semi-cured coating film on the end portion of the aluminum alloy pieces. The aluminum alloy pieces subjected to the coating operation were then placed for 15 min in a warm air dryer set at 60° C. to volatilize the solvent, placed for 15 min in a hot air dryer set at 110° C., taken out, and allowed to cool. As a result of heating, the prime coating film was additionally cured and the modified polyolefin was melted.

After one week, the aluminum alloy pieces with the two-layer coating film were inserted in an injection molding die that was set to 80° C., a random-type PP (manufactured by Prime Polymer Co., Ltd. (headquarters: Tokyo, Japan)) including 30% of GF was injected at an injection temperature of 270° C. and an injection joined article in which the aluminum alloy piece was integrated with the PP injection-molded body (see FIG. 6) was obtained. The joining surface is 0.5 cm$^2$ (5 mm×10 mm). Next day, the obtained injection joined article was broken by tension with a tensile tester by using a jig for measuring a shear breaking stress shown in FIG. 7, and a shear breaking stress between the metal portion and resin portion was measured.

Comparative Example 1

The operations were performed in exactly the same manner as in Example 1, except that SUPERCHLON 822 (acid-modified chlorinated polyolefin resin, weight-average molecular weight: 60,000, melting point: 75° C.; manufactured by Nippon Paper Industries Co., Ltd. (headquarters: Tokyo, Japan)) was used as the modified polyolefin resin.

The fixing strength of the obtained injection joined article was measured. The results are shown in Table 1.

Comparative Example 2

The operations were performed in exactly the same manner as in Example 1, except that SUPERCHLON 892L (acid-modified chlorinated polyolefin resin, weight-average molecular weight: 60,000, melting point: 85° C.; manufactured by Nippon Paper Industries Co., Ltd.) was used as the modified polyolefin resin. The fixing strength of the obtained injection joined article was measured. The results are shown in Table 1.

Comparative Example 3

The operations were performed in exactly the same manner as in Example 1, except that SUPERCHLON 224H (acryl-modified chlorinated polyolefin resin, weight-average molecular weight: 70,000, melting point: 90° C.; manufactured by Nippon Paper Industries Co., Ltd.) was used as the modified polyolefin resin. The fixing strength of the obtained injection joined article was measured. The results are shown in Table 1.

Comparative Example 4

The operations were performed in exactly the same manner as in Example 1, except that the below-described modified polyolefin resin 5 was used as the modified polyolefin resin. The fixing strength of the obtained injection joined article was measured. The results are shown in Table 1.

<Production of Modified Polyolefin Resin 5>

A total of 100 parts by mass of ethylene-1-butene copolymer-type polypropylene (ethylene 10%, propylene 80 mol %, 1-butene 10 mol %, weight-average molecular weight 90,000, Tm=120° C.), 6.0 parts by mass of maleic anhydride, 5.0 parts by mass of lauryl methacrylate, 0.5 part by mass of n-butyl methacrylate, and 2 parts by mass of dilauryl peroxide were kneaded and reacted by using a twin-screw extruder set at 170° C. Vacuum degassing was performed in the extruder to remove residual unreacted materials, thereby obtaining a modified polyolefin resin 5 which had a weight-average molecular weight of 60,000 and Tm=120° C. and had a grafted mass of maleic anhydride of 4.0 mass % and a total grafted mass of lauryl methacrylate and n-butyl methacrylate of 3.8 mass %.

Comparative Example 5

The operations were performed in exactly the same manner as in Example 1, except that the modified polyolefin resin 2 was used as the modified polyolefin resin. The fixing strength of the obtained injection joined article was measured. The results are shown in Table 1.

Comparative Example 6

The operations were performed in exactly the same manner as in Example 1, except that the modified polyolefin resin 3 was used as the modified polyolefin resin. The fixing strength of the obtained injection joined article was measured. The results are shown in Table 1.

TABLE 1

| | Melting point of polyolefin resin | Injected resin | Die temperature | Average adhesive strength n = 5 MPa |
|---|---|---|---|---|
| Example 1 | 72° C. | homo type | 80° C. | 17.8 |
| | | random type | | 17.7 |
| | | block type | | 16.8 |
| | | homo type | 100° C. | 14.4 |
| | | random type | | 16.7 |
| | | block type | | 13.4 |
| Example 2 | 72° C. | random type | 80° C. | 17.6 |
| | | random type | 100° C. | 17.7 |
| Example 3 | 100° C. | random type | 80° C. | 16.7 |
| | | random type | 100° C. | 16.6 |
| Example 4 | 88° C. | random type | 80° C. | 14.2 |
| | | random type | 100° C. | 18.6 |
| Example 5 | 72° C. | random type | 80° C. | 17.1 |
| Comparative Example 1 | 75° C. | random type | 80° C. | 10.4 |
| | | random type | 80° C. | 8.1 |
| Comparative Example 2 | 85° C. | random type | 100° C. | 11 |
| | | random type | 100° C. | 7.6 |
| Comparative Example 3 | 90° C. | random type | 80° C. | Measurements are impossible |
| | | random type | 100° C. | Measurements are impossible |
| Comparative Example 4 | 120° C. | random type | 80° C. | Measurements are impossible |
| | | random type | 100° C. | 2.3 |
| Comparative Example 5 | 65° C. | random type | 80° C. | 12.3 |
| | | random type | 100° C. | 10.5 |
| Comparative Example 6 | 135° C. | random type | 80° C. | Measurements are impossible |
| | | random type | 100° C. | 85 |

[2. Examples of the Second Multilayer Composite Body of a Metal and a Polypropylene-Based Resin Composition of the Present Invention]

Examples of the second multilayer composite body of a metal and a polypropylene-based resin composition of the present invention will be explained hereinbelow on the basis of test examples.

Test Example 1 (Multilayer Composite Body of an Aluminum Alloy and a Polypropylene-Based Resin Composition)

(Production of Modified Polyolefin Resin)

A total of 100 parts by mass of 1-butene copolymer-type polypropylene (propylene 80 moil, 1-butene 20 moil, weight-average molecular weight 250,000, Tm=88° C.), 3.5 parts by mass of maleic anhydride, 3.0 parts by mass of octyl methacrylate, 0.5 part by mass of 2-ethylhexyl methacrylate, and 2 parts by mass of dilauryl peroxide were kneaded and reacted by using a twin-screw extruder set at 170° C. Vacuum degassing was performed in the extruder to remove residual unreacted materials, thereby obtaining a modified polyolefin resin which had a weight-average molecular weight of 180,000 and Tm=88° C. and also had a grafted mass of maleic anhydride of 3.1 mass % and a total grafted mass of octyl methacrylate and 2-ethylhexyl methacrylate of 3.0 mass %.

The grafted mass of maleic anhydride was measured by an alkali titration method, and the total grafted mass of octyl methacrylate and 2-ethylhexyl methacrylate was measured by $^1$H-NMR. Meanwhile, a coat liquid was obtained by dissolving the modified polyolefin resin in a mixed solvent including methyl cyclohexane and MEK at 8:2. This coat liquid was used in the below-described Test Example 1.

(Metal Piece and Coating Treatment)

A large number of aluminum thin-sheet pieces of a 100 mm×100 mm square shape were cut out from a commercially available aluminum alloy A5052 sheet with a thickness of 0.5 mm. Holes with a diameter of about 1 mm were drilled in two locations of the end portion of each piece, and the pieces were suspended on steel wires covered with polyvinyl chloride (gardening wires). The pieces were then chemically etched to obtain a surface roughened on a micron order. Thus, the aluminum thin-sheet pieces were immersed for 5 min in an aqueous solution (at 60° C.) including 7.5% of an aluminum cleaner (degreasing agent) "NE-6 (manufactured by Meltex Inc., headquarters: Tokyo, Japan)" in an immersion tank, and then washed with public tap water (Ota City, Gunma Prefecture, Japan). An aqueous solution of hydrochloric acid with a concentration of 1% (at 40° C.) was prepared in a separate immersion tank, and the aluminum thin-sheet pieces were immersed in this tank for 1 min and then washed with water. A 1.5% aqueous solution of caustic soda (at 40° C.) was prepared in yet another immersion tank, and the aluminum thin-sheet pieces were immersed for 4 min in this tank and then washed with water. Then, in yet another immersion tank, the aluminum thin-sheet pieces were immersed for 3 min in an aqueous solution of nitric acid with a concentration of 3% (at 40° C.) and then washed with water. Subsequent drying was performed with a dryer.

A commercially available urethane-based two-pack isocyanate curable ink "SG740 (manufactured by Seiko Advance Ltd. (headquarters: Tokyo, Japan))" was acquired, the main liquid and curable liquid were mixed at a predetermined mixing ratio, and a predetermined solvent was added in an amount indicated by the manufacturer to obtain a prime coat liquid. This coat liquid was coated with a brush on the front surface of the aluminum alloy piece treated by the above-described treatment method. The testpiece was placed for 15 min in a warm air dryer set at 80° C. and removed therefrom, and the prime ink layer was semi-cured. A thick layer of the produced modified polyolefin coat liquid was coated on the semi-cured coating film. The testpiece was then plated in a warm air dryer and heated for 10 min at 55° C. to vaporize the solvent. The temperature of the warm air dryer was then set to 115° C. and the temperature was raised to the set temperature. The testpiece was allowed to stay for about 15 min at this temperature, taken out from the dryer, allowed to cool, and stored.

(Stamping Molding and Coating Treatment)

The above-described press die was used in which a square recess of 100 mm×100 mm×20 mm (depth) was formed in a lower mold, an upper mold was placed on the recess. The press die was such that a square sheet-shaped article of 100 mm×100 mm×about (3 mm to 10 mm) could be press molded. Meanwhile, a commercially available PP stampable sheet (JFE Chemical Corporation (headquarters: Tokyo, Japan)) of an A4 size and a thickness of about 1 mm was acquired. This sheet was cut with scissors into a large number of small pieces of about 30 mm×about 30 mm. The small pieces were collected in an amount enabling the molding of a 100 mm×100 mm×4 mm (thickness) GFRTP and placed in a SUS container. Meanwhile, a nitrogen gas was continuously fed from a nitrogen cylinder through a regulator into a hot air dryer, the inside of the hot air dryer was filled with the nitrogen gas which flowed thereinto at all times, and the temperature was raised to 200° C. The door of the hot air dryer was opened, the SUS container including a large number of the stampable sheet small pieces was quickly put therein, the door was closed, and heating was conducted for 15 min. Thus, the stampable sheet was heated in the nitrogen gas atmosphere.

Only the lower mold of the press die was set in the above-described press machine, and a collection of the stampable sheet small pieces was rapidly loaded into the cavity portion of the lower mold from the SUS container taken out from the hot air dryer. The upper mold was quickly placed thereon, and molding was performed (stamping molding was performed) by applying a pressure of 5 MPa, with reference to the cavity sheet-shaped surface area (100 cm$^2$). After 30 sec, the press machine was opened, the press die was taken out from the press machine, the die was opened, and the stamping molded article was taken out. As for the external appearance, no resin leaked from the press die, and the obtained stamping molded article had a size of 100 mm×100 mm×3.8 mm (thickness).

The next day, the obtained sheet-shaped stamping molded article was subjected to mechanical processing. Thus, most of the four side portions was cut, as shown in FIG. 2, with a high-speed saw equipped with a diamond blade to obtain a 97 mm×97 mm×3.8 mm (thickness) sheet-shaped article. In the shape of this example, the uncut portions (protruding portions) 2 were produced in 12 locations. Further, ports which were through holes were opened in 8 locations (not depicted in the figure), two of them were left as ports 4, and PP rods with a diameter of 3 mm and a length of 5 mm which were cut from a PP rod-shaped injection molded article were inserted into the remaining 6 ports. The periphery of the PP rods was melted and the position thereof was fixed by lightly applying the tip of a long nail heated with a gas burner to the insertion portion. The ports corresponded to two pinpoint gates, and a large number of protruding portions formed on the other side surface and upper and lower surfaces served to maintain the spatial position in the cavity of the injection molding die 10.

After the above-descried processing, the modified polyolefin resin coat liquid obtained in Test 1 was spray coated by using a sprayer over the entire surface of the stamping molded article depicted in FIG. 2. The coating was followed by drying. The article was then placed for 15 min in a warm air dryer set at 115° C., taken out of the dryer, allowed to cool and wrapped in an OPP (biaxially stretched polypropylene) film for storage.

(Insert Injection Molding)

An injection molding die 10 equipped with two pinpoint gates (see FIG. 3) such that a 100 mm×100 mm×5.5 mm (thickness) square piece could be molded was fabricated. The injection molding die 10 was mounted on a vertical injection molding machine, the injection molding die 10 was opened, and the above-mentioned fabricated shaped metal article 9 with a coating film was inserted into the cavity 13 of the fixed die so that the coating film was on the upper side. The abovementioned stamping molded article with a coating film was placed thereon. After this insertion, the injection molding die 10 was closed, and PP including 30% of GF was injected.

This injection molding produced a PP-based GFRTP sheet-shaped article to which an aluminum alloy thin sheet with a smooth surface was attached (not depicted in the figure). Where the center of the sheet-shaped article is supported with a thumb and a periphery is hit with a metal rod, the sound produced is that of a hard oak board. In addition, the peripheral portion was cut with a high-speed rotary saw equipped with a diamond blade and a 90 mm×90 mm×5.5 mm (thickness) sheet-shaped article (not depicted in the figure) was obtained for checking the state of the cross section and the bond strength. No abnormal state in external appearance was observed on the cut surface of the GFRTP sheet-shaped article, and the aluminum alloy thin sheet did not peel off from the GFRTP sheet-shaped article.

(Measurement of Fixing Strength (Shear Force))

A bond strength in the multilayer composite body of the aluminum alloy and polypropylene-based resin composition, which was obtained in Test Example 1, was measured. The measurement method is described below. FIG. 10 is an external appearance view of an intermediate product 20 of a measurement piece for the measurements. The intermediate product 20 was obtained by cutting the GFRTP sheet-shaped article with the metal thin sheet attached thereto (not depicted in the figure) which was fabricated in Test Example 1 into 90 mm×15 mm rectangular pieces and bonding a SPCC sheet piece 21 with an epoxy adhesive to the metal thin-sheet portion 9'. The SPCC sheet piece 21, which can be also referred to as a measurement jig, was bonded to prevent the joining surface 23 (see FIG. 11) from deformation when a tensile breaking stress is loaded. Thus, the shear stress at the joining surface 23 between the metal thin-sheet portion 9' and a GFRTP portion 1' depicted in FIG. 11 can be accurately measured.

The multilayer laminate (GFRTP sheet-shaped article) which is the 90 mm×90 mm sheet-shaped article obtained in Test Example 1 is cut with a high-speed rotary saw equipped with a diamond blade to obtain a 90 mm×15 mm sheet-shaped multilayer composite body. Meanwhile, SPCC with a thickness of 1.6 mm is cut to produce the 90 mm×15 mm×1.6 mm SPCC piece 21. This piece is bonded with the multilayer composite body adhesive to obtain the intermediate product 20 depicted in FIG. 10.

The SPCC piece 21 was NAT (abbreviation of Nano adhesion tech.) treated by the following method. The treatment method is based on the method disclosed in PTL 2 and serves to maximize the adhesive strength with an epoxy adhesive. Thus, the SPCC piece 21 was immersed for 5 min in an aqueous solution (at 60° C.) including 7.5% of the above-described aluminum cleaner (degreasing agent) "NE-6" in an immersion tank and then washed with public tap water (Ota City, Gunma Prefecture, Japan). A 1.5% aqueous solution of caustic soda (at 40° C.) was then prepared in a separate immersion tank, and the SPCC piece 21 was immersed therein for 1 min and then washed with water. Then, an aqueous solution of sulfuric acid with a concentration of 5% (at 60° C.) was prepared in a separate immersion tank, and the SPCC piece 21 was immersed therein for 4 min and then washed with water. The piece was then immersed for 1 min in ammonia water with a concentration of 1% in another separate tank and washed with water. Then, in yet another immersion tank, the piece was immersed for 5 min in an aqueous solution (at 45° C.) including potassium permanganate with a concentration of 2%, acetic acid with a concentration of 1%, and hydrated sodium acetate with a concentration of 0.5%. Subsequent drying was performed with a dryer.

An adhesive prepared by mixing a curing agent with a two-pack epoxy adhesive "1500 (manufactured by Cemedine Co., Ltd. (headquarters: Tokyo, Japan))" as the main liquid was coated on the entire one surface of the SPCC piece 21 subjected to the aforementioned treatment. This surface was then bonded to the side surface of the shaped metal article 9' in the multilayer composite body of the aluminum alloy (shaped metal article 9') and the polypropylene-based resin composition. Thus, the SPCC piece 21 was attached to the aluminum alloy thin sheet (shaped metal article 9') side of the 90 mm×15 mm×5.5 mm (thickness) GFRTP piece with the aluminum alloy thin sheet attached thereto, and then fixed with a clip. Curing was performed till the next day and the intermediate product 20 depicted in FIG. 5 was fabricated. In the intermediate product 20, the shear breaking stress between the shaped metal article 9' and the GFRTP portion 1' cannot be measured.

Figure 11:
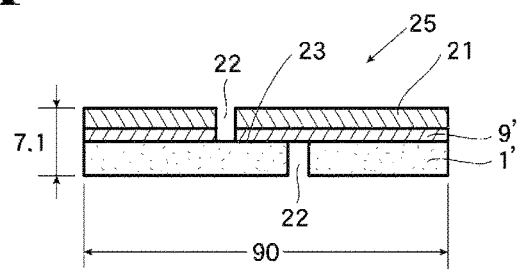
FIG. 11 is a side view of a measurement piece for measuring a shear breaking stress in the intermediate product depicted in FIG. 10 in which two incisions were made.

FIG. 11 is a side view of a measurement piece for measuring a shear breaking stress in the intermediate product 20 depicted in FIG. 10 in which two incisions were made. The intermediate product 20 was cut to obtain a 90 mm×15 mm×7.1 mm angular rod of the shape depicted in FIG. 11. A measurement piece 25 was produced by introducing two incisions 22 into the intermediate product 20 by using a milling machine, such as to obtain the shape depicted in FIG. 11. Where the measurement piece 25 is pulled until breaking from both ends by using the measurement jig, a force at which the joining surface 23 breaks, that is, the fixing strength (shear breaking stress) between the shaped metal article 9', which is the aluminum alloy, and the GFRTP portion 1', can be measured. When the fixing strength at the joining surfaces 23 of three such measurement pieces 25 was measured, the average was 13.4 MPa.

Test Example 2

(Multilayer Composite Body of Thin Sheet of Copper)

A large number of 100 mm×100 mm square pieces were cut out from a C1100 copper thin sheet with a thickness of 0.5 mm. Holes with a diameter of about 1 mm were drilled in two locations of the end portion of each piece, and the pieces were suspended on steel wires covered with polyvinyl chloride (gardening wires). The pieces were then chemically etched to obtain a surface roughened on a micron order. Thus, the thin-sheet pieces were immersed for 5 min in an aqueous solution (at 60° C.) including 7.5% of an aluminum cleaner (degreasing agent) "NE-6" same as in Test Example 1 in an immersion tank, and then washed with public tap water (Ota City, Gunma Prefecture, Japan). A 1.5% aqueous solution of caustic soda (at 40° C.) was prepared in yet another immersion tank, and the copper thin-sheet pieces were immersed for 1 min in this tank and then washed with water. Then, a 10% aqueous solution of nitric acid (at 40° C.) was prepared in another immersion tank, and the thin-sheet pieces were immersed for 0.5 min therein. Then, a 3% aqueous solution of nitric acid (at 40° C.) was prepared in another immersion tank, and the thin-sheet pieces were immersed for 10 min therein and then washed with water. The thin pieces were then immersed for 4 min in an aqueous solution (at 25° C.) including hydrogen peroxide with a concentration of 4%, sulfuric acid with a concentration of 10%, and trisodium phosphate with a concentration of 0.3% in a separate immersion tank and then washed with water. Subsequent drying was performed with a dryer.

After this, the two-pack urethane curable ink "SG740" and the modified polyolefin coat liquid obtained in Test Example 1 were coated in exactly the same manner as in Test Example 1, heated, and fixedly attached. Then, the stamping molded article was obtained in the same manner as in Test Example 1, and the GFRTP sheet-shaped article with a copper thin sheet attached thereto was obtained in exactly the same manner as in Test Example 1. Further, a SPCC piece was adhesively bonded and a measurement piece (see FIG. 6) suitable for a tensile breaking test was obtained in the same manner as in Test Example 1. When the fixing strength of the copper thin sheet and the GFRTP portion was measured, the average of three results was 13.2 MPa.

INDUSTRIAL APPLICABILITY

The multilayer composite body of a metal and a polypropylene-based resin composition of the present invention is a multilayer composite body of a metal and a lightweight weather-resistance PP-based resin composition or a PP-based GFRTP sheet material. Therefore, this multilayer composite body can be used for wall materials such as cover materials of mobile machines and outdoor equipment. Further, the lightweight high-strength PP-based GFRTP material which is difficult to assemble with metal materials such as steel materials can be mechanically fastened with screws or bolts and nuts by using the metal portion and can be assembled with other material. Therefore, the multilayer composite body can be also used as a structural part of various machines.

REFERENCE SIGNS LIST 1, 1', 5 Stamping molded articles
2 Circumferential-surface protrusion
3 Side-surface protrusion
4 Through hole
9, 9' Shaped metal article
10 Injection molding die
11 Fixed mold plate
12 Movable mold plate
13 Cavity
14 Gap
16 Gate
20 Intermediate product
25 Shear testpiece

The invention claimed is:
1. A multilayer composite body of a metal and resins in which a thermosetting resin layer, a modified polyolefin resin layer, and a polypropylene-based resin composition are laminated on a shaped metal article, wherein the modified polyolefin resin layer satisfies the following Condition (1) or Condition (2):
Condition (1)
the modified polyolefin resin layer includes a modified polyolefin resin which has a weight-average molecular weight of 100,000 to 200,000 and a melting point of 70° C. to 110° C., as determined with a differential scanning calorimeter (DSC), and in which two or more selected from an α,β-unsaturated carboxylic acid or a derivative of the α,β-unsaturated carboxylic acid (B) and a (meth)acrylic acid ester (C) are graft polymerized onto a copolymer-type polyolefin (A) as a base material; and
Condition (2)
the modified polyolefin resin layer includes two or more of modified polyolefin resins in which two or more selected from an α,β-unsaturated carboxylic acid or a derivative of the α,β-unsaturated carboxylic acid (B) and a (meth)acrylic acid ester (C) are graft polymerized onto a copolymer-type polyolefin (A) as a base material, a weighted average of melting points of the two or more included modified polyolefin resins being 70° C. to 110° C.
2. The multilayer composite body of a metal and resins according to claim 1, wherein
a thermosetting resin layer, a modified polyolefin resin layer, a polypropylene-based resin composition, and a glass fiber reinforced thermoplastic plastic (GFRTP) are laminated on the shaped metal article.
3. The multilayer composite body of a metal and resins according to claim 2, wherein
a surface of the glass fiber reinforced thermoplastic plastic (GFRTP) has the modified polyolefin resin layer.
4. The multilayer composite body of a metal and resins according to claim 1, wherein
the thermosetting resin layer is a coat material containing a urethane resin or an epoxy resin.
5. The multilayer composite body of a metal and resins according to claim 1, wherein
the polypropylene-based resin is molded by injection molding; and
an average shear breaking stress between the shaped metal article and the polypropylene-based resin is 13 MPa or more.
6. The multilayer composite body of a metal and resins according to claim 1, wherein
the copolymer-type polyolefin (A) is at least one selected from the group consisting of ethylene copolymer-type polypropylene, 1-butene copolymer-type polypropylene, and ethylene-1-butene copolymer-type polypropylene.
7. The multilayer composite body of a metal and resins according to claim 1, wherein
the (meth)acrylic acid ester (C) is at least a compound represented by General Formula (1):

$$CH_2=CR_1COOR_2 \qquad (1)$$

(here, in Formula (1), $R_1$=H or $CH_3$, $R_2$=$C_nH_{2n+1}$, n is an integer of 8 to 18).
8. The multilayer composite body of a metal and resins according to claim 1, wherein
at least one of the grafted mass of the α,β-unsaturated carboxylic acid or a derivative thereof (B) and the grafted mass of the (meth)acrylic acid ester (C) is 0.1 mass % to 10 mass %.
9. A method for producing a multilayer composite body of a metal and resins comprising:
a step of preparing a shaped metal article with a chemically or physically roughened surface;
a step of coating a first coat material containing a urethane resin or an epoxy resin on the shaped metal article and semi-curing the resin layer by heating;
a step of coating, on the semi-cured first coat material, a second coat material composed of a modified polyolefin resin which has a weight-average molecular weight of 100,000 to 200,000 and a melting point of 70° C. to 110° C., as determined with a differential scanning calorimeter (DSC), and in which an α,β-unsaturated carboxylic acid or a derivative thereof (B) and a (meth)acrylic acid ester (C) are graft polymerized onto a copolymer-type polyolefin (A) as a base material, then heating, allowing to cool, additionally curing the first coat material as a prime layer and the second coat material, and melting and fixedly attaching the modified polyolefin resin coat material layer; and
a step of obtaining an injection joined article by inserting the shaped metal article on which the first coat material and the second coat material have been coated and fixed into an injection molding die, injecting a polypropylene-based resin composition onto the second coat material, and opening the die to integrate the shaped metal article and the polypropylene-based composition with each other.

10. The method for producing a multilayer composite body of a metal and resins, according to claim 9, wherein the second coat material includes two or more of modified polyolefin resins, and a weighted average of melting points of the modified polyolefin resins is 70° C. to 110° C.

11. A method for producing a multilayer composite body of a metal and resins, the method comprising:
a step of preparing a shaped metal article with a chemically or physically roughened surface;
a step of coating a first coat material composed mainly of a urethane resin or an epoxy resin on the shaped metal article and semi-curing the resin layer by heating;
a step of coating, on the semi-cured first coat material, a second coat material composed of a modified polyolefin resin which has a weight-average molecular weight of 100,000 to 200,000 and a melting point of 70° C. to 110° C., as determined with a differential scanning calorimeter (DSC), and in which an α,β-unsaturated carboxylic acid or a derivative thereof (B) and a (meth)acrylic acid ester (C) are graft polymerized onto a copolymer-type polyolefin (A) as a base material, then heating, allowing to cool, additionally curing the first coat material as a prime layer and the second coat material, and melting and fixedly attaching the modified polyolefin resin coat material layer; on the semi-cured first coat material,
the modified polyolefin resin being obtained by graft polymerizing two or more selected from an α,β-unsaturated carboxylic acid or a derivative of the α,β-unsaturated carboxylic acid (B) and a (meth)acrylic acid ester (C) onto a copolymer-type polyolefin (A) as a base material
a step of inserting the shaped metal article on which the first coat material and the second coat material have been coated and fixed, and a glass fiber reinforced thermoplastic plastic (GFRTP) including glass fibers and a polypropylene resin as a matrix resin into an injection molding die; and
a step of obtaining a multilayer composite body by injecting a polypropylene-based resin composition between the second coat material and the glass fiber reinforced thermoplastic plastic (GFRTP) to integrate the shaped metal article and the glass fiber reinforced thermoplastic plastic (GFRTP) with each other.

12. The method for producing a multilayer composite body of a metal and resins, according to claim 11, wherein the second coat material includes two or more of modified polyolefin resins, and a weighted average of melting points of the modified polyolefin resins is 70° C. to 110° C.

* * * * *